(12) United States Patent
Kodate et al.

(10) Patent No.: US 12,401,229 B2
(45) Date of Patent: Aug. 26, 2025

(54) POWER-RECEIVING-DEVICE BASED ON WIRELESS POWER SYSTEM

(71) Applicant: Aeterlink Corp., Tokyo (JP)

(72) Inventors: Naoto Kodate, Tokyo (JP); Yuji Tanabe, Tokyo (JP)

(73) Assignee: Aeterlink Corp., Tokyo (JP)

( * ) Notice: Subject to any disclaimer, the term of this patent is extended or adjusted under 35 U.S.C. 154(b) by 0 days.

(21) Appl. No.: 18/033,816

(22) PCT Filed: Oct. 28, 2020

(86) PCT No.: PCT/JP2020/040537
§ 371 (c)(1),
(2) Date: Apr. 26, 2023

(87) PCT Pub. No.: WO2022/091270
PCT Pub. Date: May 5, 2022

(65) Prior Publication Data
US 2023/0396102 A1    Dec. 7, 2023

(51) Int. Cl.
*H02J 50/20*    (2016.01)
*B25J 18/00*    (2006.01)
(Continued)

(52) U.S. Cl.
CPC .............. *H02J 50/20* (2016.02); *B25J 18/00* (2013.01); *H02J 50/12* (2016.02); *H02J 50/402* (2020.01); *H02J 50/80* (2016.02)

(58) Field of Classification Search
None
See application file for complete search history.

(56) References Cited

U.S. PATENT DOCUMENTS 9,027,417 B2    5/2015    Sato
9,461,714 B2    10/2016   Cook et al.
(Continued)

FOREIGN PATENT DOCUMENTS

JP    2011-514781 A    5/2011
JP    2014-029326 A    2/2014
(Continued)

OTHER PUBLICATIONS

Extended European Search Report received in corresponding European Application No. 20959788.9 dated Jun. 28, 2024.
(Continued)

*Primary Examiner* — Daniel Kessie
(74) *Attorney, Agent, or Firm* — Mattingly & Malur, PC

(57) ABSTRACT

A power-receiving device including: a power-receiving antenna for receiving electromagnetic waves; a rectifier functionally connected to the power-receiving antenna, for converting the electromagnetic waves into DC voltages; a first power storage device functionally connected to the rectifier, for storing the DC voltages therein; a second power storage device functionally connected to the first power storage device, for storing the DC voltages therein; a device functionally connected to the second power storage device; a first switch for controlling distribution of electric power between the rectifier and the first power storage device; a second switch for controlling distribution of electric power between the first power storage device and the second power storage device; a third switch for controlling distribution of electric power between the first power storage device and the device; a fourth switch for controlling distribution of electric power between the second power storage device and the device; and a controller.

13 Claims, 14 Drawing Sheets

(51) Int. Cl.
*H02J 50/12* (2016.01)
*H02J 50/40* (2016.01)
*H02J 50/80* (2016.01)

(56) References Cited

U.S. PATENT DOCUMENTS

| | | | |
|---|---|---|---|
| 10,481,189 B2 | 11/2019 | Kuyvenhoven et al. | |
| 10,992,280 B2 | 4/2021 | Mimino | |
| 11,128,170 B1* | 9/2021 | Guedon | H02M 1/0025 |
| 11,296,553 B2 | 4/2022 | Nakanishi et al. | |
| 2007/0229044 A1* | 10/2007 | Visairo-Cruz | H02M 1/10 |
| | | | 323/282 |
| 2010/0171369 A1* | 7/2010 | Baarman | H04B 5/79 |
| | | | 307/104 |
| 2013/0207599 A1* | 8/2013 | Ziv | H02J 50/80 |
| | | | 320/108 |
| 2014/0121787 A1* | 5/2014 | Yamazaki | H02M 3/156 |
| | | | 700/19 |
| 2014/0333257 A1 | 11/2014 | Akiyoshi et al. | |
| 2016/0156200 A1* | 6/2016 | Kim | H02J 50/20 |
| | | | 307/104 |
| 2017/0098963 A1 | 4/2017 | Takahashi et al. | |
| 2017/0133888 A1* | 5/2017 | Uchida | H02J 50/80 |
| 2017/0194817 A1* | 7/2017 | Takatsu | B60L 53/126 |
| 2017/0222436 A1* | 8/2017 | Wendt | H02J 1/08 |
| 2018/0062452 A1 | 3/2018 | Uehara | |
| 2018/0249473 A1 | 8/2018 | Tomeba et al. | |
| 2019/0379239 A1* | 12/2019 | Rozgic | A61N 1/3787 |
| 2020/0036231 A1 | 1/2020 | Nakao | |
| 2022/0173619 A1* | 6/2022 | Yagi | H02J 7/04 |
| 2022/0278554 A1* | 9/2022 | Mishima | B60L 53/124 |

FOREIGN PATENT DOCUMENTS

| | | |
|---|---|---|
| JP | 2015-029398 A | 2/2015 |
| JP | 2015-523840 A | 8/2015 |
| JP | 2018-170536 A | 11/2018 |
| JP | 2018-182955 A | 11/2018 |
| JP | 2019-088085 A | 6/2019 |
| JP | 2019-135900 A | 8/2019 |
| JP | 2019-205296 A | 11/2019 |
| JP | 2020-018146 A | 1/2020 |
| JP | 2020-080602 A | 5/2020 |
| JP | 2020-156246 A | 9/2020 |
| JP | 2020-161935 A | 10/2020 |
| WO | 2016/109318 A1 | 7/2016 |
| WO | 2019/021655 A1 | 1/2019 |
| WO | 2020/129178 A1 | 6/2020 |

OTHER PUBLICATIONS

International Search Report of PCT/JP2020/040537 dated Jan. 19, 2021.

Japanese Office Action issued in corresponding Japanese Application No. 2022-558689, dated Dec. 3, 2024.

\* cited by examiner

FIG. 19
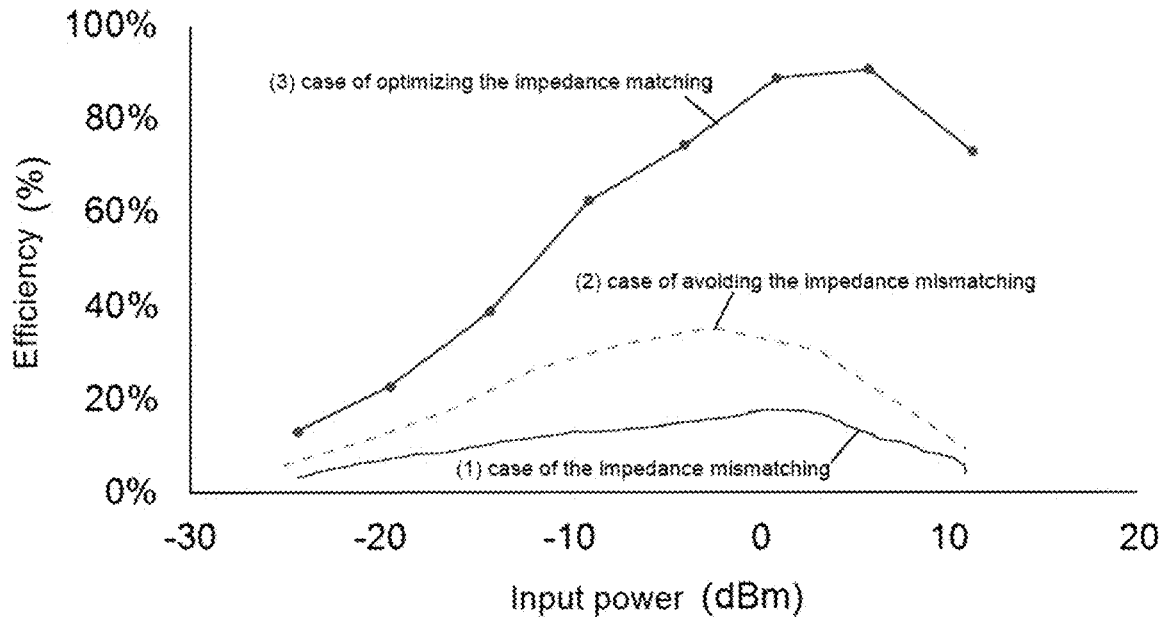
FIG. 20
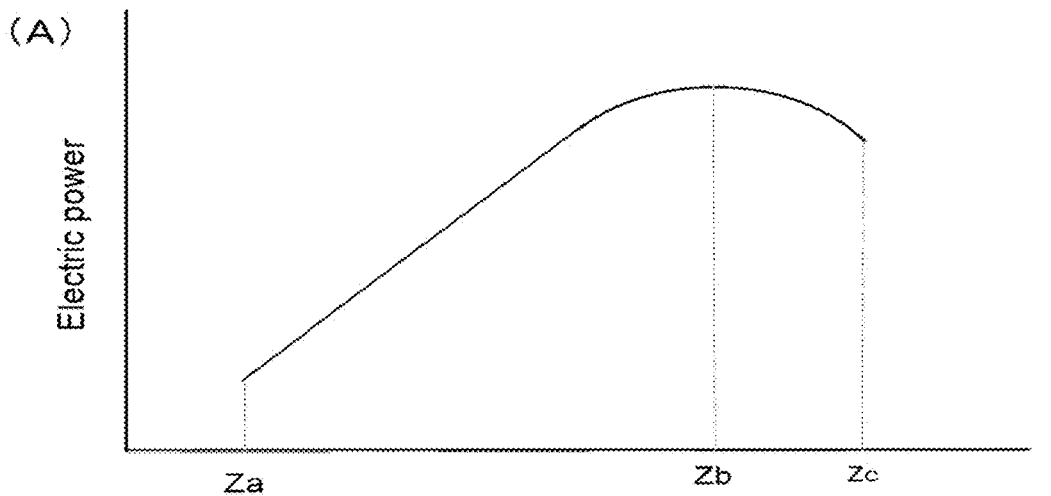
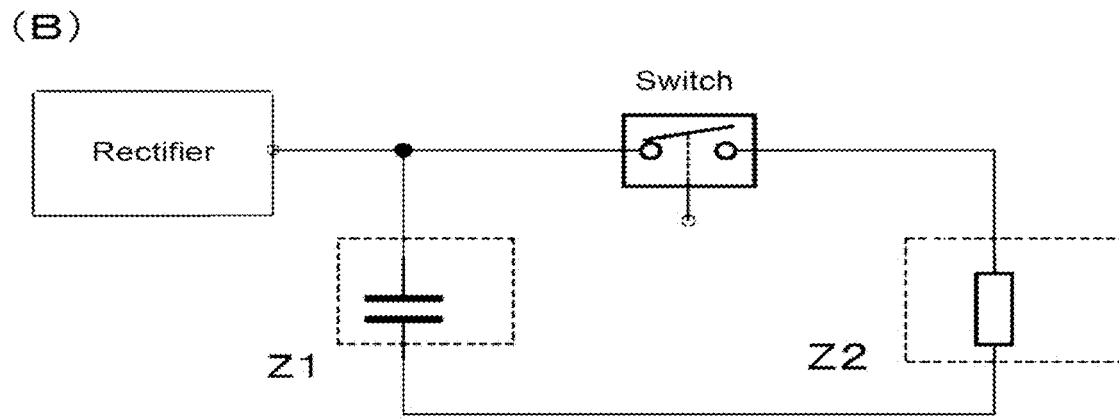

FIG. 27
(A)
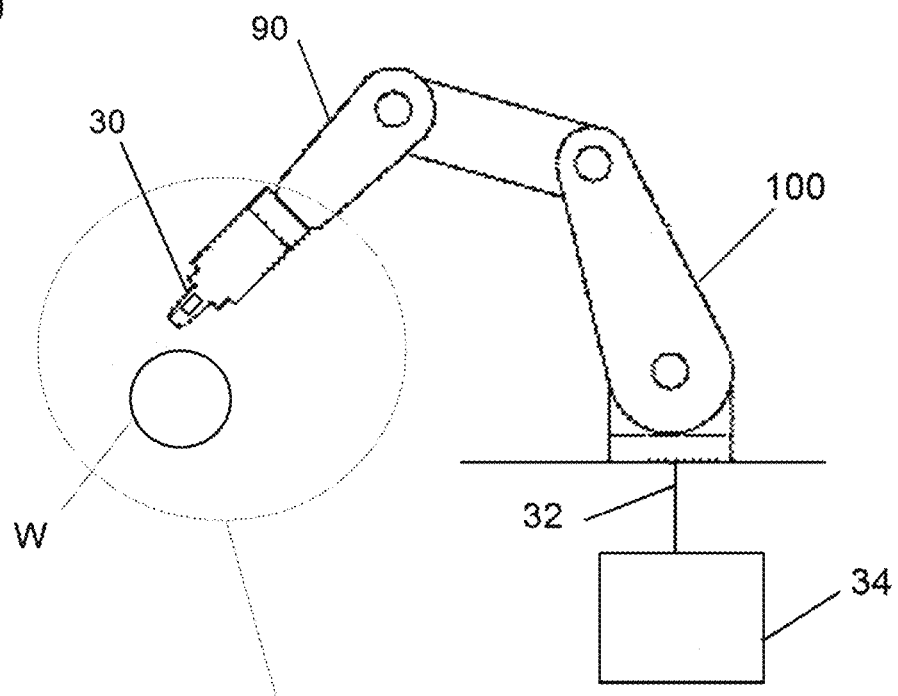
(B)
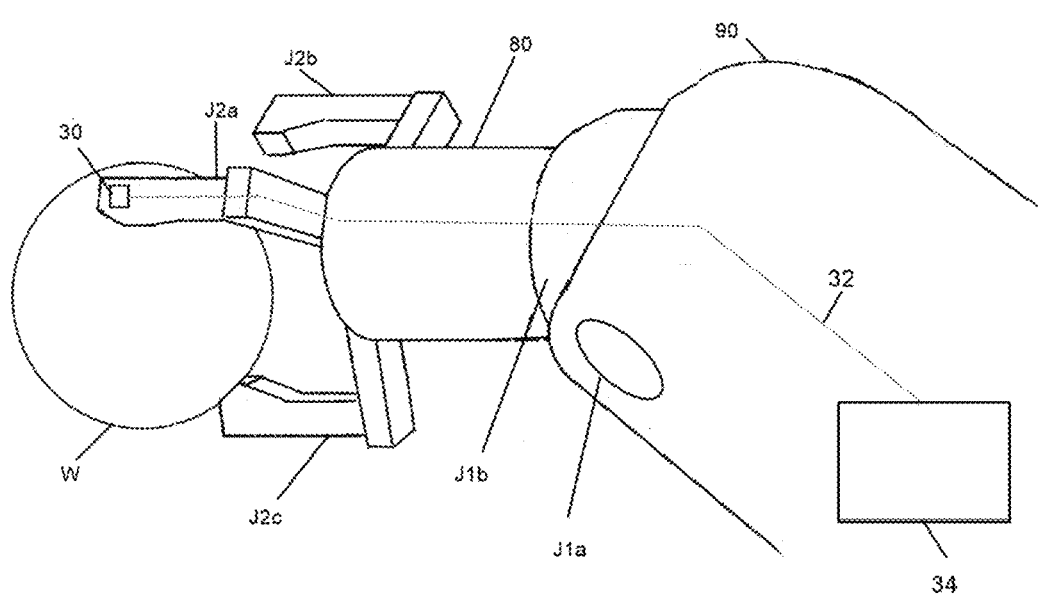

FIG. 28

| Amount of electric power | Kind of sensor | Kind of power storage device |
|---|---|---|
| 1000mWh~ | electrostatic sensor<br>liquid leakage/water-detection sensor<br>isolator<br>torque sensor<br>non-contact-temperature sensor<br>strain sensor | secondary battery<br>(lithium ion battery,<br>nickel-hydrogen battery<br>or all-solid battery, etc.) |
| 100mWh~1000mWh | color sensor<br>laser sensor<br>linear cage<br>potentiometer<br>force sensor<br>liquid level sensor<br>touch sensor<br>rotation sensor<br>inclination sensor | |
| 10mWh~100mWh | pressure sensor<br>angle sensor | large capacitance capacitor<br>(electric double layered capacitor, etc.) |
| 1mW~10mWh | proximity sensor<br>seismic sensor<br>temperature-humidity-sensor<br>MR sensor<br>position sensor<br>SAW sensor | small capacitance capacitor<br>(electric field capacitor or ceramic capacitor, etc.) |

FIG. 29

| State | v1 | v2 | Sensor | SW1 | SW2 | SW3 | SW4 |
|---|---|---|---|---|---|---|---|
| 0 | Low | Low | Off | Off | Off | Off | Off |
| 1 | High | Low | Off | On | Off | Off | Off |
| 2 | High | High | Off | On | On | Off | Off |
| 3 | Low | Low | On | Off | Off | Off | On |
| 4 | High | Low | On | On | Off | Off | On |
| 5 | High | High | On | On | On | Off | On |
| 6 | High | High | On | On | On | On | Off |

FIG. 30

| State | v1 | v2 | Sensor | SW31 | SW32 | SW33 | SW34 | SW36 | SW37 |
|---|---|---|---|---|---|---|---|---|---|
| 0 | Low | Low | Off | Off | Off | Off | Off | Off | Off |
| 1 | High | Low | Off | On | Off | Off | Off | Off | Off |
| 2 | High | High | Off | Off | On | Off | Off | Off | Off |
| 3 | Low | Low | On | Off | Off | Off | On | Off | Off |
| 4 | High | Low | On | On | Off | Off | On | Off | Off |
| 5 | High | High | On | Off | Off | On | Off | Off | Off |
| 6 | Low | Low | On | Off | Off | Off | On | On | Off |
| 7 | High | Low | On | On | Off | Off | On | On | Off |
| 8 | High | High | On | Off | Off | On | Off | Off | On |

POWER-RECEIVING-DEVICE BASED ON WIRELESS POWER SYSTEM

FIELD OF THE INVENTION

The present invention relates to a power-receiving device and a power-transmitting device for performing wireless power supply (or wireless power feeding) to a device which consumes electric power and is included in a machine such as an articulated robot.

BACKGROUND

In the fields of plants (FA: Factory Automation), Internet of things (IoT), and home electric appliances, etc., various types of machines are used. In many cases, generally, in the machines used in the fields of the FA, etc., wiring for performing data communication is made wirelessly, but wiring for a power source is not made wirelessly.

With respect to the background art on this technical field, there is JP2014-29326A (which is hereinafter referred as Patent Document 1). In the Patent Document 1, it is disclosed that "a force sensor for detecting external force is configured to include a sheath (2); a pressure member (1) provided on the sheath; a sensor unit for detecting force applied to the pressure member; and a slip ring unit configured to supply power or transmit signals through a contact point on a non-rotation side (6) and a contact point on a rotation side (7), and characteristically, both of the force sensor unit and the slip ring unit are included in the sheath, and power is supplied or signals are transmitted between the slip ring unit and the force sensor unit (see summary)".

PRIOR ART DOCUMENTS

[Patent Document 1] JP2014-29326A

SUMMARY OF THE INVENTION

Problem to be Solved by the Invention

According to the Patent Document 1, it is described that electric power is supplied with regard to a sensor which is included in an articulated robot, especially in a distal end side of a robot arm. Further, it is also disclosed that electric power transmitted from an external power source is supplied to the sensor through a wiring for a power source (or a power line) which is provided in in the robot arm (see FIG. 9 of the Patent Document 1).

However, to supply electric power wirelessly to the sensor is not disclosed in the Patent Document 1.

Accordingly, it is an object of the present disclosure to provide a system for efficiently supplying electric power wirelessly, for operating a device (or a module) included in a machine such as an articulated robot.

Means for Solving the Problem

To solve the above-mentioned problems, for example, the configuration described in the claims is applied. The present disclosure includes a plurality of means for solving the above-mentioned problems, and an example is given below.

A power-receiving device for receiving electric power transmitted from a power-transmitting device, according to a wireless power supply system, and for supplying the electric power to a device (or a module) is configured to include:

a power-receiving antenna for receiving electromagnetic waves;

a rectifier functionally connected to the power-receiving antenna, for converting the electromagnetic waves into DC voltages;

a first power storage device functionally connected to the rectifier, for storing the DC voltages therein;

a second power storage device functionally connected to the first power storage device, for storing the DC voltages therein;

a device (or a module) functionally connected to the second power storage device;

a first switch for controlling distribution of electric power between the rectifier and the first power storage device;

a second switch for controlling distribution of electric power between the first power storage device and the second power storage device;

a third switch for controlling distribution of electric power between the first power storage device and the device;

a fourth switch for controlling distribution of electric power between the second power storage device and the device; and a controller.

Effect of the Invention

According to the present disclosure, it becomes possible to provide a system for efficiently supplying electric power wirelessly, for operating a device included in a machine or the like.

Problems, configurations, and effects except those mentioned above will be clarified by referring to the description of the following embodiments.

BRIEF DESCRIPTION OF THE DRAWINGS

FIG. 19 is an example of a diagram schematically illustrating each state of the impedance matching.

FIG. 20 is an example of a diagram schematically illustrating optimizing of the impedance matching.

FIG. 27 is an example of a diagram schematically illustrating a case of performing wired power supply to a device included in a machine from an external power source through a power line.

FIG. 28 is an example of a diagram illustrating an amount of power required for each of the sensors 30.

FIG. 29 is an example of a diagram illustrating each state of the power-receiving circuit of the power-receiving device of FIG. 5.

FIG. 30 is an example of a diagram illustrating each state of the controlling of the four switches SW31 to SW34 illustrated in FIG. 16.

DESCRIPTION OF THE PREFERRED EMBODIMENTS

Example 1

Figure 1:
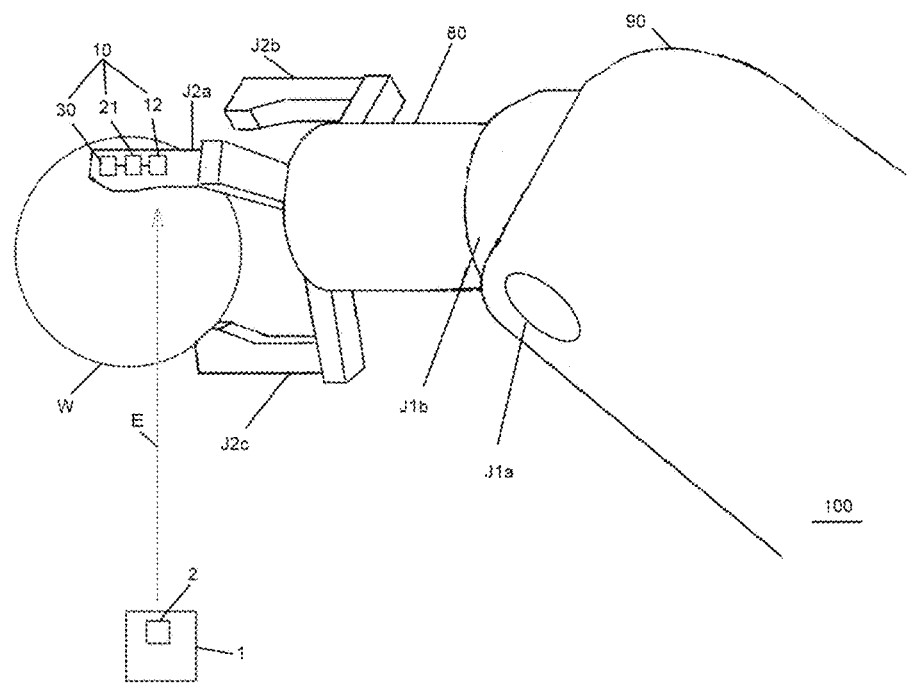
FIG. 1 is an example of a diagram schematically illustrating a case of performing wireless power supply to a device included in a machine (example 1).

FIG. 27 illustrates an example in which electric power is supplied from a power source 34 to a device (or a module) 30 consuming electric power. The sensor is included in a distal end side of an articulated robot 100 and is supplied with electric power through a wire 32 which is arranged in the articulated robot 100. A plurality of joints J1a, J1b, J2a, J2b, and J2c are provided in a robot arm unit 90 and/or a robot hand unit 80 of the articulated robot 100. The articulated robot 100 is capable of performing various operations such as grasping and/or moving a workpiece W at a high degree of freedom by the motion of the joints.

In a case where a wire 32 is provided inside the articulated robot 100 in order to supply electric power to a sensor 30 included in the articulated robot 100, there are several problems. For example, when the joints J1a, J1b, J2a, J2b, and J2c of the articulated robot 100 are operated, loads may be applied to the wire. Accordingly, there is a risk that the wire may be broken. Furthermore, performing maintenance of the wire will be required.

In addition, in a machine (for example, the articulated robot 100) which is capable of performing various operations at a high degree of freedom, various components such as actuators or the like are already provided therein. Therefore, there is a problem that a size of a space for installing a wire is limited.

Therefore, in order to avoid the above-mentioned problems of the wire 32, it is examined that the sensor 30 is supplied with electric power which is transmitted wirelessly. However, there are unique problems in making the power supply wiring of the machine 100 wireless. For example, when electric power is supplied wirelessly, a relatively small capacity (or amount, quantity) of electric power is transmitted. Accordingly, the capacity of electric power to be transmitted to the device 30 becomes a problem. In a case when sufficient electric power may not be transmitted thereto, it is not preferable because the type and the use mode of the device 30 to be used will be limited.

In addition, when electric power is supplied wirelessly, an impedance mismatching may become a problem. The impedance mismatching refers to a condition in which an impedance matching is not made. The impedance mismatching is not preferable because it may be a cause of a deterioration of efficiency in terms of transmitting energy.

FIG. 1 schematically illustrates an example in which a power-transmitting device 1 and a power-receiving device 10 are used for supplying (or feeding) electric power wirelessly to a device 30 consuming electric power. The sensor 30 is provided in a distal end side of a machine 100 which is used in the fields of the FA (such as a factory), IoT (such as a building management system), or home electric appliances, etc.

Articulated Robot

The machine 100 illustrated in FIG. 1 is, for example, an industrial robot (including machine tools) or a home robot (including home electric appliances) or the like. The machine 100 can be used in a variety of applications, such as grasping, picking, placing, assembling, painting, welding, etc., of a workpiece or component W. Preferably, the machine 100 is an articulated robot which is capable of performing various operations at a high degree of freedom.

In general, the articulated robot 100 includes a plurality of (at least two) shafts and/or joints J1a, J1b, J2a, J2b, and J2c for operating a robot arm unit 90 and/or a robot hand unit 80 at a high degree of freedom (see FIG. 1). In general, as the number of the joints J1a, J1b, J2a, J2b, and J2c becomes larger, the degree of freedom of the articulated robot 100 becomes higher, but more precise control will be required accordingly. On the other hand, as the number of the joints J1a, J1b, J2a, J2b, and J2c becomes smaller, the mechanism of the articulated robot 100 becomes simpler, and a malfunction thereof will be less likely to occur.

FIG. 1 schematically illustrates the joints J1a and J1b of the robot arm unit 90, corresponding to a part of a human arm, and also the joint J2a, J2b, and J2c of the robot hand unit 80, corresponding to a part of a human hand. The articulated robots 100 is capable of performing functions such as rotating or displacing, etc., at the joints J1a, J1b, J2a, J2b, and J2c. In general, the articulated robot 100 is configured to include a plurality of axes (for example, the number is about from 2 to 8). Also, in general, the robot hand unit 80 is configured to include a plurality of fingers (for example, the number is about from 2 to 5). The present example is not limited by the number, shape, function, etc. of the joints or fingers of the articulated robot 100.

The mechanism for moving a plurality of joints of the robot arm unit 90 of the articulated robot 100 may be variously configured. For example, it is possible to apply a series of mechanisms for moving a plurality of joints of the robot arm unit 90 sequentially. It is also possible to apply parallel mechanisms (for example, parallel link) for moving a plurality of joints simultaneously. The articulated robot 100 may be, for example, a vertical articulated robot or a horizontal articulated robot. The articulated robot 100 is not limited to a robot arm and a robot hand, but may also be a gantry robot or the like.

The robot hand unit 80 illustrated in FIG. 1 is also referred to as a chuck. The chuck is configured to move a plurality of fingers in a predetermined direction (for example, in a vertical direction, etc.) to open and close for grasping a workpiece or comportment W by the actuator (see J2*a*, J2*b*, and J2*c* in FIG. 1). An arbitrary device 30 may be provided in order to detect the position of the mechanical movement of the chuck (for example, an upward position or a downward position). Also, an arbitrary device 30 may be provided in order to detect whether the chuck is grabbing the comportment W or not. In the former case, an arbitrary control for opening and closing the chuck in a predetermined direction is performed. In the latter case, by detecting the hardness of the component W (for example, hardness or softness, etc.), an arbitrary control of the chuck is performed accordingly.

As depicted in FIG. 1, in a case where a device consuming electric power is included in the machine 100, it is required to supply electric power to the device 30. In the present example, a power-transmitting device 1 having a power-transmitting antenna 2 for transmitting wirelessly electric power to the device 30 is provided to the outside of the machine 100. In addition, a power-receiving device 10 having a power-receiving antenna 12 is provided to the inside of the machine 100 or on the machine 100. Preferably, the power-receiving device 10 is provided in the machine 100 for receiving wirelessly energy E transmitted from the power-transmitting device 1. In addition, the power-receiving device 10 is physically connected to the device 30 for supplying electric power to the device 30. As a result, the need for wiring for supplying electric power to the device 30 within the articulated robot 100 is eliminated or minimized.

Sensor

As the device 30 to be provided in the articulated robot 100 illustrated in FIG. 1, for example, a sensor 30 is used.

In FIG. 28, it is exemplified that required power amount can be varied depending on the type of the sensor 30. Here, the power consumption amount of the sensor is roughly calculated. For example, the power amount is calculated supposing that an inter-capacitor voltage is made to be 3.3V, the power amount in full charging is recorded, and the sensor is continuously operated for one hour.

Preferably, the sensor 30 provided in the articulated robot 100 is a small and light-weight sensor consuming low power. For example, the sensor 30 is capable of detecting the mechanical movement of the chuck, or the condition of the tactile sensitivity. For example, the sensor 30 may be a proximity sensor, a MR sensor, a hall element, a position sensor, or the like.

The proximity sensor 30 is a sensor which is capable of reacting when the workpiece W comes closer thereto. For example, the proximity sensor 30 has a body of cylindrical shape or thin plate shape, with a detecting surface at one end of the body, and a cable is made to be extended from the opposite side of the body. The detecting surface may be provided at an arbitrary position of the robot hand unit 80, and is configured to react when the workpiece W approaches thereto.

Various types of proximity sensors are known. For example, one type of the proximity sensors may react when a metal approaches thereto. There are various types of detection distances of the proximity sensor 30. For example, one type of the proximity sensors may detect an object on the mm unit. The proximity sensor 30 does not have to contact with an object for detecting it. Accordingly, it is not deteriorated by abrasion with an object, and it has water-proofness and dust-proofness. Further, it has the advantage of hardly broken. Especially, in a case of the proximity sensor which is capable of reacting with a metal, it has the advantage that it is less susceptible to dust or water drops, and it has less erroneous detection.

The sensor 30 may be a MR (Magnetic Resistance) sensor or a magnetic sensor. The MR sensor 30 is a sensor which is capable of measuring the magnitude and the direction of the magnetic field. There are various types of the MR sensor 30 according to the strength of the magnetic field to be detected, the distinction between AC and DC, the measurement environment, and the object. For example, the MR sensor 30 is capable of measuring the magnitude of the magnetic field by using the magnetoresistance effect in which the electric resistance of solid varies with according to the magnetic field.

The sensor 30 may be a hall element. The hall element 30 is a sensor which is capable of measuring the magnetic flux density by using the hall effect. The hall effect is a phenomenon in which an electromotive force appears in a direction orthogonal to both current and magnetic field when the magnetic field is applied to an object in which the current is flowing, and when the magnetic field is applied perpendicular to current. Based on the type of the hall sensor, the hall sensor can generate an analog voltage or a digital output in proportion to the magnetic flux density.

Furthermore, the sensor 30 may be any one of a displacement sensor, an inspection sensor, a discrimination sensor, a measuring sensor, a length measuring sensor, a vibration sensor, a microphoto sensor, a pressure sensor, a flow sensor, a temperature-humidity sensor, a human detecting sensor, a wear sensor, an acceleration sensor, a strain sensor (or distortion sensor), or a force sensor, etc.

Furthermore, the sensor 30 may be any one of a CMOS sensor, a photoelectric sensor, a laser sensor, an ultrasonic sensor, a touch sensor, a linear cage, a potentiometer (or position sensor), an image sensor, a color sensor, a LiDAR sensor, a TOF sensor, a seismic sensor, a gyroscopic sensor, an inclination sensor, a rotation sensor, an angle sensor, a tachometer, a load cell, a false sensor, a torque sensor, a liquid level sensor, a liquid leakage/water detection sensor, a non-contact temperature sensor, a current sensor, an electric power sensor, an electrostatic sensor, or an isolator, etc.

The sensor 30 may be capable of appropriately detecting a workpiece W according to the color, shape, inclination, thickness or transparency of the workpiece W to be detected. For example, the sensor 30 may be capable of appropriately detecting a black workpiece, a metal workpiece, a thin workpiece or a transparent workpiece, etc. Furthermore, the sensor 30 may be configured as a combination of a plurality of sensors based on the characteristics of the workpiece W to be detected Preferably, the device 30 is a sensor of low power consumption type having a power consumption of less than or equal to 100 mWh.

More preferably, the device 30 is a sensor of low power consumption type having a power consumption of less than or equal to dozens of mWh.

Even more preferably, the device 30 is a sensor of low power consumption type having a power consumption of less than or equal to 10 mWh.

Wireless Power Supply

There are several types of the wireless power supply (or wireless power feeding). Preferably, in the present example, the wireless power supply is performed based on the microwave system between the power-transmitting device 1 and the power-receiving device 10. According to the microwave system, it is possible to transmit energy or electric power over a relatively long distance. Therefore, even when the sensor 30 to be supplied is included in the articulated robot 100 and changes its position frequently, it is possible to transmit the necessary power to the sensor 30 at a distance. However, in the microwave system, there is an upper limit to the capacity of energy to be transmitted. For example, when the wireless power supply is performed based on the microwave system, electric power of about 1 mW may be transmitted at a distance of about 1 m.

Referring again to FIG. 28, when the sensor 30 is configured as a proximity sensor, a seismic sensor (or seismoscopic sensor, shock sensor), or a temperature-humidity sensor, the sensor 30 may be operated with a relatively small electric power (about from 1 mW to 10 mW). Also, when the sensor 30 is configured as a pressure sensor or an angle sensor, larger electric power (about from 10 mW to 100 mW) will be needed. Further, when the sensor 30 is configured as a color sensor or a laser sensor, larger electric power (about from 100 mW to 1000 mW) will be needed. Therefore, when the wireless power supply is performed based on the microwave system, electric power to be transmitted to the sensor 30 may become a problem.

Figure 2:
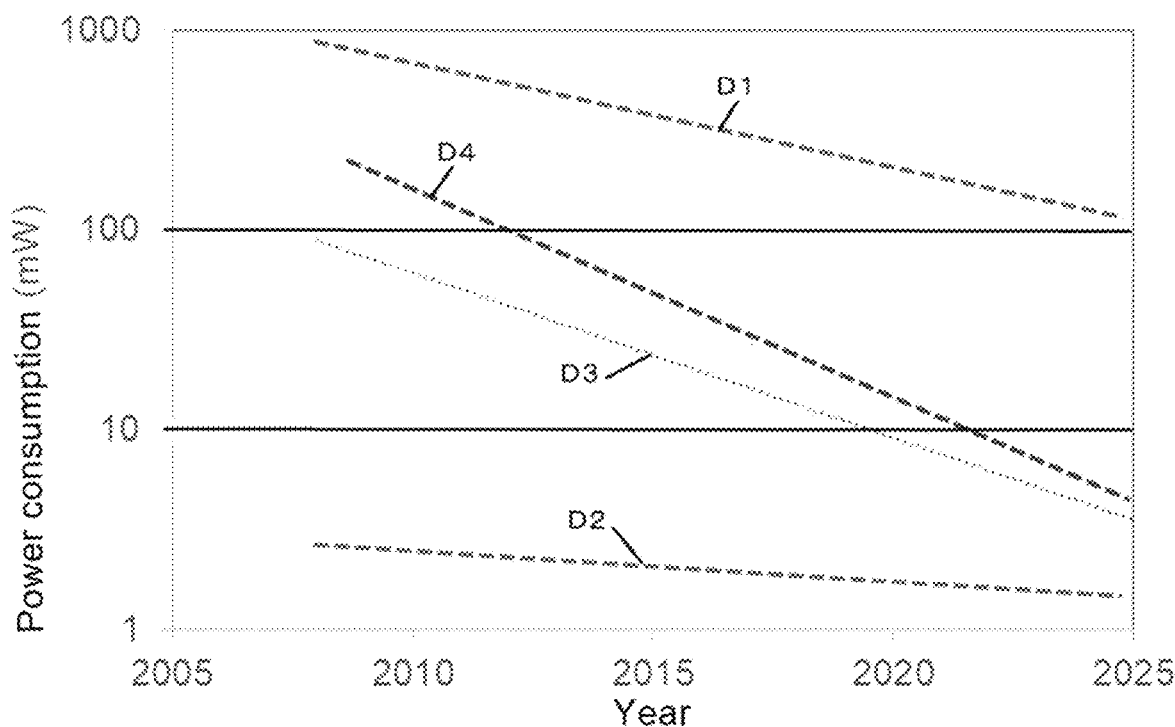
FIG. 2 is an example of a diagram schematically illustrating an amount of power required for a sensor (example 1).

FIG. 2 schematically illustrates a graph of power consumption typically required for various types of the device 30. For example, as depicted by the reference symbol D1, relatively large electric power will be needed for operating an edge-computing (for example, a microcontroller, a terminal, a processor, etc.). On the other hand, as depicted by the reference symbol D2, relatively small electric power will be needed for operating a sensor. As depicted by the symbol D3, electric power required for operating a radio communication IC is greater than that of D2, though not as high as that of D1. Research and development of miniaturization and capacity enlargement of these electronic components have been conducted in various fields. As the FIG. 28 shows, the power consumption required for the electronic components tends to decrease year by year. However, values shown by D2 and the like are simplified. In addition, as the FIG. 28 shows, the required electric power varies depending on the type of the sensor 30.

As indicated by the reference symbol D4, when a radio communication IC (or a wireless communication IC) is connected to the device 30 to be powered, the required electric power is increased. With regard to the radio communication IC, for example, there are specifications for the short-range radio communication, such as Bluetooth (registered trademark), ZigBee (registered trademark), Sub-GHz (for frequency band less than Sub-1 GHz or 1 GHz), Wi-Fi (registered trademark), IO-Link (registered trademark), Thread, multi-standard, WIRED, IEEE802.15.1 or IEEE802.15.4, or a protocol having specifications for the short-range radio communication in PHY (Physical Layer). In a case when the sensor 30 is combined with the radio communication IC, electric power of about from 10 to 30 mW may be required at the time of transmitting or receiving of data. The sensor 30 may be configured to have a radio communication function (for example, a SAW sensor or a surface elastic wave filter) instead of being connecting with the radio communication IC.

When the wireless power supply is performed based on the microwave system, there is an upper limit to the capacity of the energy to be transmitted. Therefore, electric power to be transmitted may become a problem in a case when a relatively large capacity is required according to the type of the sensor 30 to be supplied (see FIG. 28), or in a case when the sensor 30 is connected with the radio communication IC (see FIG. 2), or in a case when a plurality of sensors are supplied. Therefore, in the present example, when the wireless power supply is performed based on the microwave system, it is conducted in combination with a battery managing system (or a battery management system) 21 (see FIG. 1). The battery managing system 21 is a system for wirelessly transmitting electric power to a battery and for operating the system (for example, the device 30) with that electric power. In FIG. 1, it is schematically illustrated that energy or electric power E transmitted from the power-transmitting antenna 2 of the power-transmitting device 1 is received by the power-receiving antenna 12 of the power-receiving device 10. Then, that energy E is transmitted to a battery in the battery managing system 21, and subsequently, the energy E is transmitted to the sensor 30.

As exemplified in FIGS. 28 and 2, power consumption is approximately determined for each device 30 (for example, a sensor, a radio communication IC, or an edge computing). In addition, there are limitations on the device 30 that can be operated without using a battery. Further, as illustrated in FIG. 2, the power consumption required for each device 30 tends to decrease year by year. That is, by using the battery managing system 21 for conducting the wireless power supply, it becomes possible to operate more types of the devices 30, as compared to a system without using a battery. In addition, the target range of the wireless power supply is increasing year by year. Accordingly, in the present embodiment, it is important that the battery managing system 21 is used in combination with the wireless power supply.

In FIG. 1, it is illustrated that the power-receiving device 10 is provided in the distal end side of the articulated robot 100 (for example, in the distal end side of the robot arm unit 90 or in the distal end side of the robot hand unit 80). In general, there is enough space in a finger of the robot hand unit 80 comparing with the rest of the articulated robot 100 which is composed of a plurality of parts. Accordingly, it is preferable that the power-receiving device 10 having the power-receiving antenna 12, the battery managing system 21 and the sensor 30 is accommodated in that space. In this case, it is possible that a relatively large bulky part is configured to be flexible to be waded up for being put in the space of the finger. Also, it is possible to provide a part of the power-receiving device 10 at a location distant from the finger (for example, at a root of the finger of the robot hand unit 80, or at a wider place in the vicinity). Further, it is possible to provide a part of the power-receiving device 10 so as to protrude to the outside of the machine 100 as needed. Preferably, the separation distance between the components is reduced to minimize the length of the wiring.

It is possible to transmit energy E from a single power-transmitting device 1 to a single power-receiving device 10. It is also possible to transmit energy E from a single power-transmitting device 1 to a plurality of power-receiving devices 10. In a case when a plurality of power-receiving devices 10 are provided in the machine 100, it is possible to provide each one of the power-receiving devices 10 in each space of a finger of the robot hand unit 80. Further, it is possible to provide each one of sensors 30 in each space of a finger of the robot hand unit 80 and provide the power-receiving antenna 12 and/or the battery managing system 21 for charging the sensor 30 in a space at a root of the finger.

Power-Receiving Antenna

Figure 3:
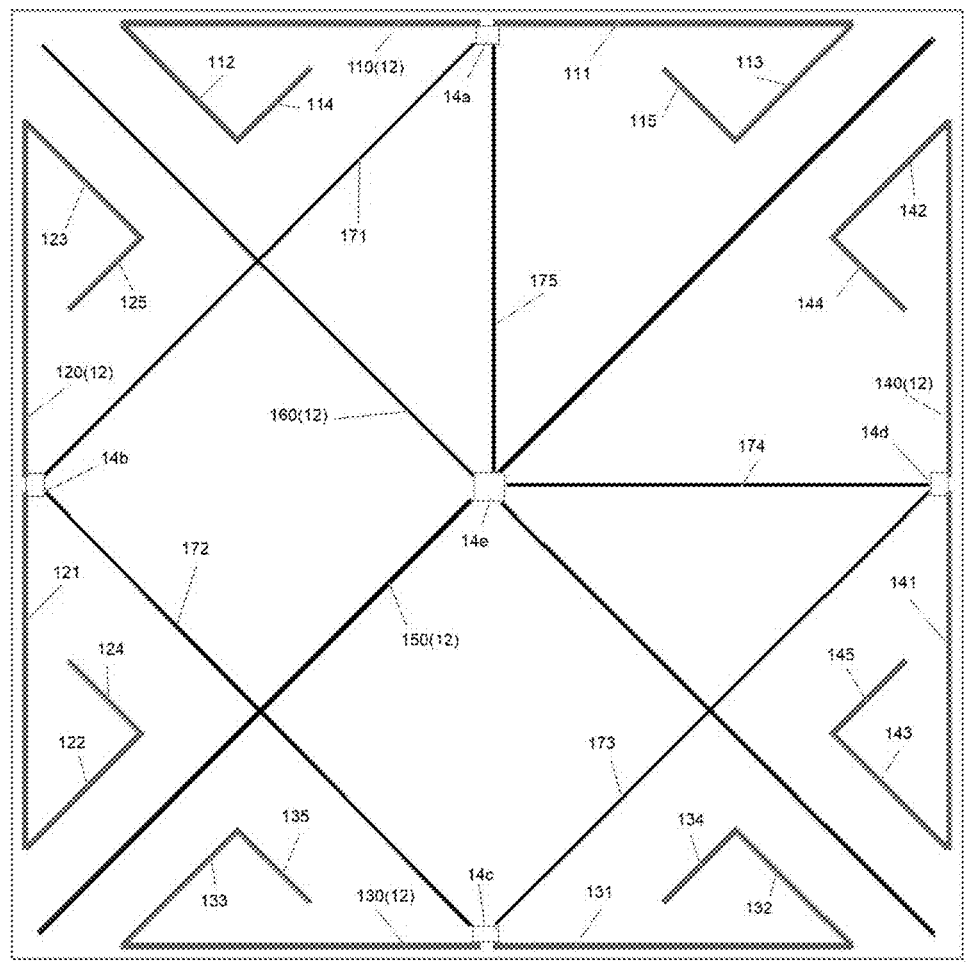
FIG. 3 is an example of a diagram illustrating a configuration of a power-receiving antenna (example 1).

FIG. 3 illustrates a plan view of a configuration example of the power-receiving antenna 12.

The power-receiving antenna 12 is a power receiving element having a function of receiving radio frequency (RF) signals or electromagnetic waves which are transmitted from the power-transmitting device 1. The power-receiving antenna 12, for example, is formed in a thin plate shape having a size of 12 cm×12 cm and a thickness of 0.5 mm. However, the size may be changed. For example, it may have a size of about 13 cm×13 cm or about 14 cm×14 cm. In addition, the thickness may be changed. For example, it may be changed to about 1 mm.

With referring to FIG. 3, the power-receiving antenna 12 is configured to have a plurality of antenna units (or antenna portions) 110, 120, 130, 140, 150, and 160 so as to receive energy E from a plurality of directions (see FIG. 1). The antenna unit may be also called as a rectenna unit. The antenna unit or the rectenna unit is an element having a function of a rectification converter for converting microwaves into DC (direct currents). The antenna units 110, 120, 130, 140, 150, and 160 are provided to form a substantially thin plate-shaped antenna 12 having an appropriate size, as a whole. The antenna 12 may be configured in multiple layers. For example, the antenna units 110, 120, 130, 140, 150, and 160 may be placed on a flexible substrate so as to have flexibility (for example, to be folded or rounded).

According to the example illustrated in FIG. 3, five antenna units 110, 120, 130, 140, and 150 are arranged on a surface side, and another single antenna unit 160 is arranged on a back side. Furthermore, connecting units (DC connections) 171, 172, 173, 174, and 175 are provided in order to connect the antenna units 110, 120, 130, 140, and 150 on the surface side and the antenna unit 160 on the back side.

On the surface side, each one of the antenna units 110, 120, 130, and 140 is arranged along each side of the square shape. Each one of the antenna units 110, 120, 130, and 140 is provided to extend over a predetermined length and to extend in a direction orthogonal with each other so as to adequately receive power at four sides. For example, each one of the antenna units 110, 120, 130, and 140 has a linear portion 111, 121, 131, 141 extending along each side, and portions folded to extend inwardly at both ends of the linear portion so as to increase or ensure electric power to be received. Accordingly, the shape of the antenna units 110, 120, 130 and 140 is not limited to the length of each side of the square, but is capable of receiving energy along a longer length including the inwardly folded portions. For example, at each corner of the square shape, each one of the antenna units has a first folded portion 112, 113, 122, 123, 132, 133, 142, or 143 that is folded inwardly at an angle of approximately 45 degrees, and a second folded portion 114, 115, 124, 125, 134, 135, 144, or 145 that is further folded inwardly at an angle of approximately 90 degrees. Furthermore, each antenna unit may have a third folded portion that is further folded (not shown).

Furthermore, at the central side of the square shape on which antenna units 110, 120, 130 and 140 are arranged, as viewed from the front surface side, an antenna unit 150 is provided to extend in a straight line, diagonally (at 45 degrees) from the right upper side to the left lower side of the square shape. These five antenna units 110, 120, 130, 140, and 150 are arranged so that each two adjacent antenna units 110, 120, 130, 140, and 150 are not contacted with each other, and a space formed between each two adjacent antenna units 110, 120, 130, 140, and 150 is prevented to be too large. As a result, each antenna unit is arranged so as to prevent the occurrence of loss due to electromagnetic coupling by bringing each two adjacent antenna units 110, 120, 130, 140, and 150 closer to each other. Furthermore, by having the configuration, the antenna is capable of receiving electromagnetic energy at an arbitrary angle.

In addition, at the back surface side, another antenna unit 160 is provided to extend similarly diagonally in a straight line. This antenna unit 160 on the back surface side is arranged to extend in a mirror image relationship with respect to the antenna unit 150 which is on the front surface side. Consequently, the antenna unit 160 is arranged as if to intersect with the antenna unit 150, on appearance. When viewed from the front surface side, the antenna unit 160 is arranged to extend in a straight line, diagonally from the left upper side to the right lower side of the square shape.

Furthermore, connecting units 171, 172, 173, 174, and 175 are provided for connecting the above-mentioned six antenna units 110, 120, 130, 140, 150, and 160 to each other to combine or synthesize the direct-current components (DC components). For example, when viewed from the front surface side, the connecting units 171, 172, 173, 174, and 175 are arranged to linearly connect, in an unicursal manner, the respective central portions 111, 121, 131, and 141 of the four antenna units 110, 120, 130, and 140 extending along each side of the square shape, and the respective central portions of the two antenna units 150 and 160 extending diagonally. Further, rectifiers 14*a*, 14*b*, 14*c*, 14*d*, and 14*e* are provided respectively at each of the connecting units. It is conceivable that the plurality of the rectifiers 14*a*, 14*b*, 14*c*, 14*d*, and 14*e* form one rectifier 14, as a whole.

Thus, the power-receiving antenna includes a plurality of antenna units which are arranged along the four sides and diagonal lines of a substantially square shape.

Accordingly, energy received by the power-receiving antenna 12 having a plurality of antenna units 110 to 160 is made to be sent to the rectifier 14 which is functionally connected to the power-receiving antenna 12. The rectifier 14 is an element which is capable of serving for rectification to flow electric current only in one direction. The power-receiving antenna 12 and the rectifier 14 may be integrally configured to convert RF (electromagnetic waves) received by the power-receiving antenna 12 to DC (direct current voltages).

Conventionally, in a case when an antenna is formed by juxtaposing a plurality of antenna units, there may be a case that each two adjacent antenna units interfere mutually, and thus the power receiving function is adversely influenced (for example, radio interference or radio disturbance). Further, in order to avoid such an interference, there may be a case that a relatively large space is formed between two adjacent antenna units, and thus the size of the antenna becomes too large, as a whole.

On the contrary, according to the present example, it becomes possible to more compactly dispose the antenna units 110 to 160, as a whole, by arranging the six antenna units 110 to 160, as described above. In addition, it becomes possible to avoid the occurrence of the interference between the two adjacent antenna units. Accordingly, each of the antenna units 110 to 160 is capable of receiving electric power appropriately.

Figure 4:
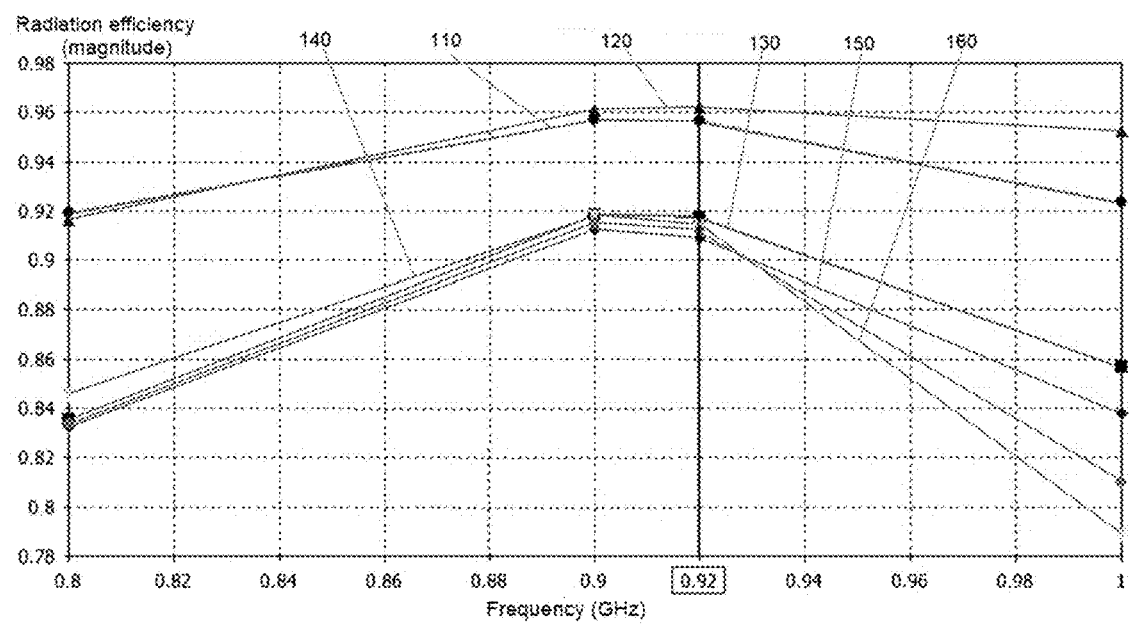
FIG. 4 is an example of a diagram illustrating the radiation efficiency of the power-receiving antenna of FIG. 3 (example 1).

In FIG. 4, a graph is illustrated for exemplifying simulation results of the power receiving conditions of the above-mentioned antenna units 110 to 160. In FIG. 4, frequencies (GHz) are depicted on the horizontal axis, and receiving efficiencies or radiation efficiencies (magnitude) are depicted on the vertical axis. As can be seen from FIG. 4, supposing that the radiation efficiency of the perfect (ideal) antenna unit is 100%, then it is confirmed that the all of the antenna units 110 to 160 exhibit radiation efficiencies above 90%, particularly in a range of from 0.9 to 0.92 GHz frequencies. Incidentally, the results shown in FIG. 4 are obtained based on three-dimensional electromagnetic field simulations. Therefore, it can be expected that good receiving results will be obtained in each direction of the X-axis, Y-axis, and Z-axis (in other words, in each direction of the vertical direction, horizontal direction, and anteroposterior direction). Besides, the position, number, size, and shape of the antenna units 110 to 160 and the rectifiers 14a to 14e are not limited to the configuration illustrated in FIG. 3.

The power-receiving antenna 12 is configured to have an adequate size to substantially cover all directions (omnidirectionally). Furthermore, the power-receiving antenna 12 may be configured to have flexibility. Accordingly, the power-receiving antenna 12 may be configured to be waded up for being put in a relatively narrow space of a finger of the robot hand unit 80. Even in this case, it is possible to maintain the relatively high efficiency of the power-receiving antenna 12. In addition to being provided inside the machine 100, the power-receiving antenna 12 may be wound for being provided in a body or a related part (for example, actuators or the like) of the machine 100, at the top side thereof.

Besides, the square shape forming the contour of the antenna 12 is not limited to a perfect square shape. In addition, each angle formed between the two sides of the square is not limited to 90 degrees. Furthermore, the contour of the antenna 12 may be polygonal or circular.

Accordingly, it is possible to optimize the power receiving condition by using the power-receiving antenna 12 which is capable of receiving electric power from any angle and of maximizing power to be received from the plurality of antennas.

Conventionally, in a case when a plurality of antennas (for example, array antenna) are used, high-frequency components are added or combined while performing a phase control. As a result, the direction of the radiation is determined uniformly. In order to receive radio waves at all angles, it is required to separate the radiation of each antenna.

On the contrary, according to the present example, it is possible to minimize the radio interference for each antenna by adding only the DC components after being rectified, because each antenna is completely separated at high frequencies. In addition, there are advantages in terms of eliminating the radio interference between the two adjacent antennas in a limited range, and arranging the antennas while keeping the high antenna efficiency (90% or more).

Power-Receiving Circuit

Figure 5:
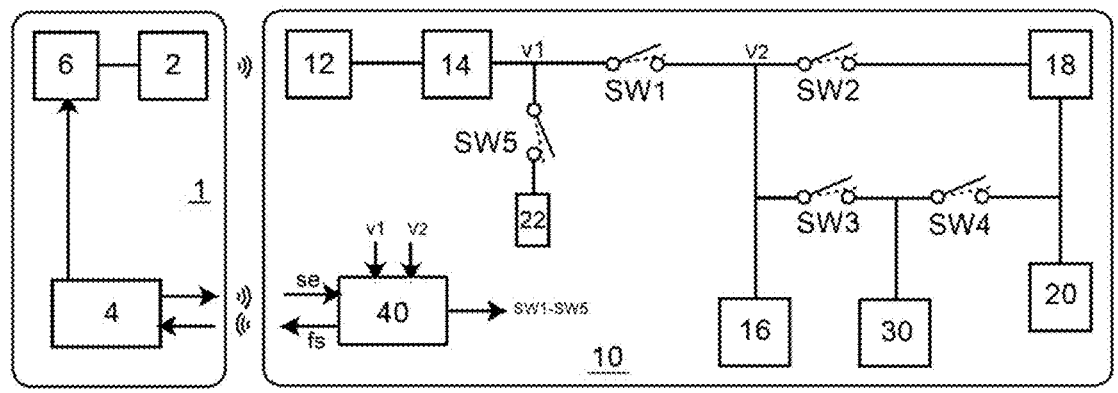
FIG. 5 is an example of a diagram illustrating an electric circuit of the power-transmitting device and that of the power-receiving device which are for performing wireless power supply (example 1).

In FIG. 5, an electric circuit is more specifically illustrated. The electric circuit is provided for performing wireless power supply between the power-transmitting device 1 and the power-receiving device 10 which are schematically illustrated in FIG. 1.

In the present example, the power-receiving device 10 is provided in a form having a sensor 30. However, in another example, the power-receiving device 10 may be provided in a form not having a sensor 30. In the latter case, the power-receiving device 10 may be connected with a sensor when it is used.

With referring to FIG. 5, the power-transmitting device 1 is configured to include: at least a power-transmitting circuit 6 for generating radio frequency (RF) signals at a frequency in a predetermined frequency range; a power-transmitting antenna 2 for transmitting the RF signals to the outside as electromagnetic energy or electromagnetic waves E; and a controller 4. Preferably, the power-transmitting device 1 uses the controller 4 for conducting a control for effectively performing wireless power supply (for example, a control of power transmitting direction of the power-transmitting antenna 2 or the like). The details thereof will be described later.

With referring to FIG. 5, the power-receiving device 10 is configured to include: a power-receiving antenna 12 for receiving electromagnetic waves (RF signals) (see FIG. 3); a rectifier 14 functionally connected with the power-receiving antenna 12 for converting electromagnetic waves (RF signals) to direct current voltages (DC) (see FIG. 3); a first power storage device (or electrical storage device) 16 functionally connected with the rectifier 14 for storing the direct current voltages (DC) therein; a second power storage device (or electrical storage device) 20 functionally connected with the first power storage device 16 for storing the direct current voltages (DC) therein; and a device or a module (for example, a sensor) 30 functionally connected with the second power storage device 20.

Power Storage Device

With referring to FIG. 5, each one of the first power storage device 16 and the second power storage device 20 is configured as a storage device which is capable of storing electricity therein. The two power storage devices 16 and 20 together form the battery managing system 21 illustrated in FIG. 1. Preferably, the first power storage device 16 is a capacitor and the second electrical storage device 20 is a battery 20 having a charger 18.

The capacitor (or condenser) 16 is an electronic component which is capable of storing electricity therein and releasing the electricity. Especially, the capacitor 16 is capable of storing electric power for operating the sensor 30. Taking into account electric power required by the sensor 30 to be powered, an arbitrary capacitor 16 having appropriate capacitance is selected. For example, the capacitor 16 is a relatively large capacitance for storing a large capacitance, such as "tens of mF or more" or "1 F or more". Research and development of miniaturization and capacity enlargement of the capacitor 16 have been conducted in various fields. The scope of the present invention is not limited by the specific capacity value. However, the capacitor 16 is configured to have a capacity to allow power supply to at least the sensor 30.

For example, capacitor 16 is an electric double layered capacitor or electrical double layer capacitor (EDLC) or a double layer capacitor. In the case of the electric double layered capacitor 16, an electric double layer formed at an interface between a solid (activated carbon electrode) and a liquid (electrolyte) is used instead of a dielectric. The electric double layered capacitor 16 uses an activated carbon having an extremely large surface area as an electrode, and thus has a relatively large capacity. Ideally, the capacitance of the electric double layered capacitor is proportional to the surface area of the electrode and inversely proportional to the distance between the electrodes. Accordingly, in this case, a very large capacitance can be realized.

The electric double layered capacitor 16 has advantages such as no limitation of the number of times for charging and discharging of power, maintenance-free, strong in charging and discharging of a large current, usable even under severe environment of temperature conditions, and excellent in rapid charging and discharging. The electric double layered capacitor 16 is also referred to as a super-capacitor or an ultra-capacitor.

The capacitor 16 may be a pseudo-capacitor (or a redox capacitor). The pseudo-capacitor is a capacitor that utilizes the Faraday reaction. The pseudo-capacitor is a power storage device having a function close to that of the electric double layered capacitor (EDLC).

The capacitor 16 may be a hybrid capacitor. The hybrid capacitor is a capacitor in which one of the two electrodes uses an electric double layer and the other electrode uses the redox reaction (oxidation-reduction).

The capacitor 16 may be a lithium-ion capacitor (Li ion capacitor). The lithium-ion capacitor is configured to have an electric double layer at the anode and a Li ion secondary cell at the cathode.

Also, the capacitor 16 may be a ceramic capacitor or a capacitor having a metal oxide sintered body (ceramic) as a dielectric. Also, the capacitor 16 may be an electric field capacitor or the like.

The second power storage device 20 is a device which is capable of storing electricity therein, and specifically, it is a battery. The battery 20 is combined with a charger 18. The charger 18 is an electronic component which is capable of charging the battery 20. The charger 18 and the battery 20 are physically connected to each other, such as by a wire, a cable, a connector, or the like.

The battery 20 is an electronic component which is capable of having a function of a cell (chemical cell) and of being repeatedly used for a plurality of times (not only once) by conducting charging. The battery 20 may also be referred to as a secondary cell, a secondary battery or a rechargeable battery. The battery 20 may be a lithium ion battery, a nickel-hydrogen battery, or an all-solid battery, etc.

Taking into account electric power necessary for the sensor 30 to be powered, an arbitrary battery 20 having appropriate capacity is selected. In the present example, electric power to be stored in the battery 20 may be limited to about from 2V to 5V. However, in other examples, electric power to be stored in the battery 20 is not limited to the above-mentioned numerical values.

As the capacity of the power storage devices 16, 20 becomes smaller, the rate for charging them with electric power becomes faster. Accordingly, taking into account the kinds and the use mode of the sensor 30 to be powered, arbitrary power storage devices 16 and 20 having the suitable charging time and power storage capacity are selected.

For example, with referring again to FIG. 28, in a case when the target to be powered is a proximity sensor or the like, a capacitor having a relatively small capacitance may be used. Also, in a case when the target to be powered is a pressure sensor or the like, a capacitor having a relatively large capacitance may be used.

In addition, with referring again to FIG. 2, in a case when the target to be powered is a proximity sensor connected with the radio communication IC, a capacitor having a relatively large capacitance may be used.

Furthermore, in a case when electric power required for operating the sensor 30 is large, the secondary battery 20 may be used.

Impedance Mismatching

As illustrated in FIG. 1, when performing wireless power supply, electromagnetic waves or radio frequency (RF) signals E are transmitted wirelessly form the power-transmitting antenna 2 of the power-transmitting device 1 to the power-receiving antenna 12 of the power-receiving device 10. In the power-receiving device 10, the RF signals are made to be converted into direct current (DC) voltages. Subsequently, the battery 20 of the battery managing system 21 (see FIG. 5) is charged. However, when performing wireless power supply, impedance mismatching may occur by connecting a side of the rectifier (RF side) and a side of the device or the sensor (DC side). The impedance mismatching is not desirable because it can cause inefficiency in terms of transmitting energy. In particular, when performing wireless power supply according to the microwave system, relatively small electric power or weak electric power is transmitted. In such a case, lowering of the efficiency may cause a major problem.

The battery 20 is ideally a device which is capable of storing electric charge without consuming electric power. That the electric power is not consumed means that there are no resistive components. Thus, ideally, even when the RF side and the battery side are connected, the problem of the impedance mismatching does not occur. However, practically, the battery may have a resistive component, so that the problem of the impedance mismatching may occur.

On the other hand, the sensor 30 is a device consuming electric power, and is constituted so as to have a resistive component. Accordingly, when the resistive component and the RF side are connected, the impedance mismatching may occur at a higher degree level. In such a case, the occurrence of disadvantages may not be prevented due to the reduced efficiency of the circuit of the sensor 30. Especially, when the sensor 30 operates at relatively weak power, the problem of the reduced efficiency may become more serious.

Therefore, in the present example, when performing wireless power supply between the power-transmitting device 1 and the power-receiving device 10, based on the microwave system, the electric circuit (see FIG. 5) is provided which is capable of transmitting sufficient power to the device 30 and of preventing the occurrence of the problem of the impedance mismatching at the side of the device 30, by using the battery managing system 21 (see FIG. 1). This is accomplished, in the present example, by means for switching (or controlling) the flow of electric power (for example, switches SW1 to SW4) to the power storage devices 16, 20 in the electric circuit illustrated in FIG. 5.

Switches SW1 to SW4

The power-receiving circuit of the power-receiving device 10 illustrated in FIG. 5 may be divided into two areas according to the frequencies, as described above. The power-receiving circuit may be separated into two areas at the capacitor 16 as a boundary. That is, it may be separated into a RF (high frequency) area on an upstream side including the antennae 12 and the rectifier 14; and a DC (low frequency) area on a downstream side including the charger 18, the battery 20 and the sensor 30. Especially, a plurality of switches SW1 to SW4 (in other words, SW1, SW2, SW3 and SW4) are provided so as to selectively supply electric power to the capacitor 16, the battery 20 and the sensor 30 in order to prevent or minimize the occurrence of impedance mismatching, particularly at the side of the sensor 30.

The switches SW1 to SW4 are configured to prevent or minimize the occurrence of impedance mismatching at the sensor 30 when electricity of microwave wirelessly received by the antenna 12 is transmitted to the sensor 30 which is preferably operated at weak power. The switches SW1 to SW4 are elements which are capable of selectively interrupting of the distribution of electric power. Hence, the switches SW1 to SW4 are capable of switching (or controlling) an on state in which the distribution of electric power is allowed and an off state in which the distribution of electric power is not allowed. The switches SW1 to SW4 are not limited to the forms illustrated in FIG. 5, and they may be configured as arbitrary elements which are capable of switching the distribution of electric power. For example, the switches SW4 may be a LDO (Low Drop-Out regulator).

In the example illustrated in FIG. 5, the power-receiving circuit is configured to include the switches SW1 to SW4 which are arranged as follows.

The first switch SW1 is arranged so as to switch the distribution of electric power between the rectifier 14 and the first power storage device (for example, a capacitor) 16.

The second switch SW2 is arranged so as to switch the distribution of electric power between the first power storage device 16 and the second power storage device (for example, a battery) 18, 20.

The third switch SW3 is arranged so as to switch the distribution of electric power between the first power storage device 16 and the device (or module) 30.

The fourth switch SW4 is arranged so as to switch the distribution of electric power between the second power storage device 18, 20 and the device 30.

Here, "to switch the distribution of electric power" means that a state in which the distribution of electric power is allowed and a state in which the distribution of electric power is not allowed are changed. In other words, it means that a state in which a switch is turned on and a state in which a switch is turned off are changed.

In the example of FIG. 5, the four switches SW1 to SW4 are illustrated in an off state (or state 0) in which the distribution of electric power is that interrupted, as depicted by the solid lines. However, the switches SW1 to SW4 are capable of being changed to an on state in which the distribution of electric power is allowed, as depicted by the dashed lines. The state 0 corresponds to, for example, a state in which the function of the power-transmitting device 1 is deactivated, or a state in which even if the function of the power-transmitting device 1 is activated, the power efficiency is poor. The electric circuit of the power-receiving device 10 is capable of selecting one of at least six different states (states 1 to states 6), as exemplified below, by turning on or off the four switches SW1 to SW4, respectively.

Figure 6:
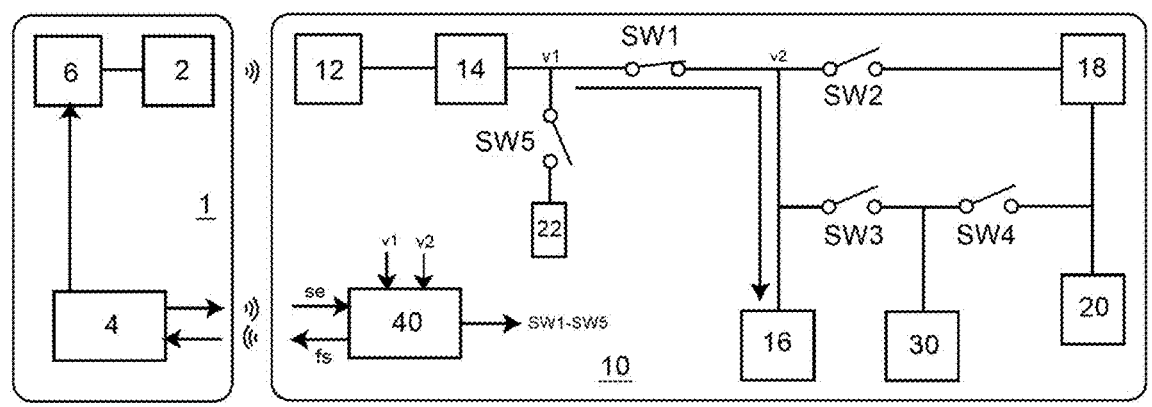
FIG. 6 is an example of a diagram illustrating a state 1 of the power-receiving circuit of FIG. 5 (example 1).

In the example illustrated in FIG. 6 (state 1), only the first switch SW1 is turned on, and all the other switches SW2 to SW4 are turned off. For example, this state 1 corresponds to a state in which the power efficiency is good, and the capacitor 16 is charged by the electric power received by the power-receiving antenna 12 side. In this state, the output of the rectifier 14 is not allowed to flow into the charger 18, the battery 20 and the sensor 30. That is, the RF side and the DC side (especially, the sensor 30) are disconnected. Accordingly, the occurrence of impedance mismatching is prevented between the two sides.

Figure 7:
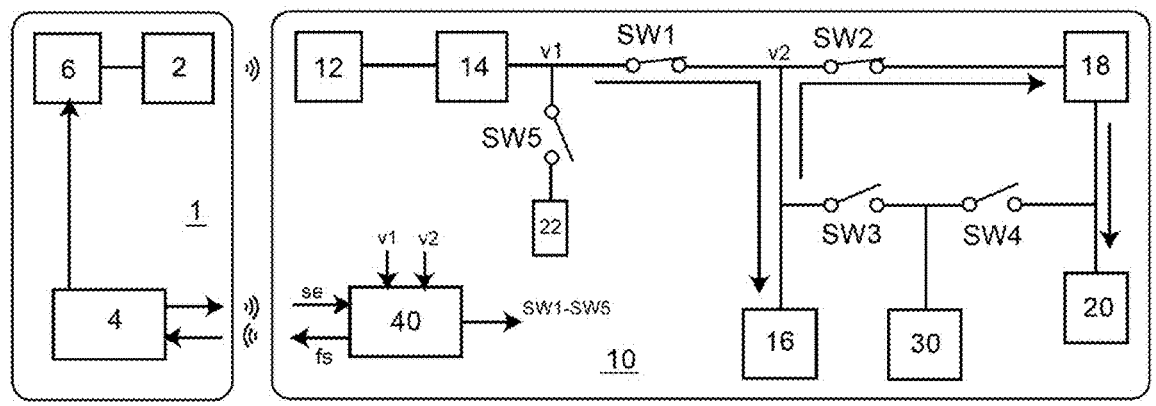
FIG. 7 is an example of a diagram illustrating a state 2 of the power-receiving circuit of FIG. 5 (example 1).

In the example of FIG. 7 (state 2), only the first switch SW1 and the second switch SW2 are turned on, and all the other switches SW3 and SW4 are turned off. For example, this state corresponds to a state in which the power efficiency is good, and the capacitor 16 is charged by the electric power received by the power-receiving antenna 12 side, and then the battery 20 is charged by the electric power stored in the capacitor 16, via the charger 18. In this state, the first switch SW1 is not turned off in order to prevent waste in energy by discarding the flow of power. In this state, especially, the third switch SW3 is turned off so that the output of the rectifier 14 is not allowed to flow into the sensor 30. That is, the RF side and the DC side (especially, the sensor 30) are disconnected. Accordingly, the occurrence of impedance mismatching is prevented between the two sides.

Figure 8:
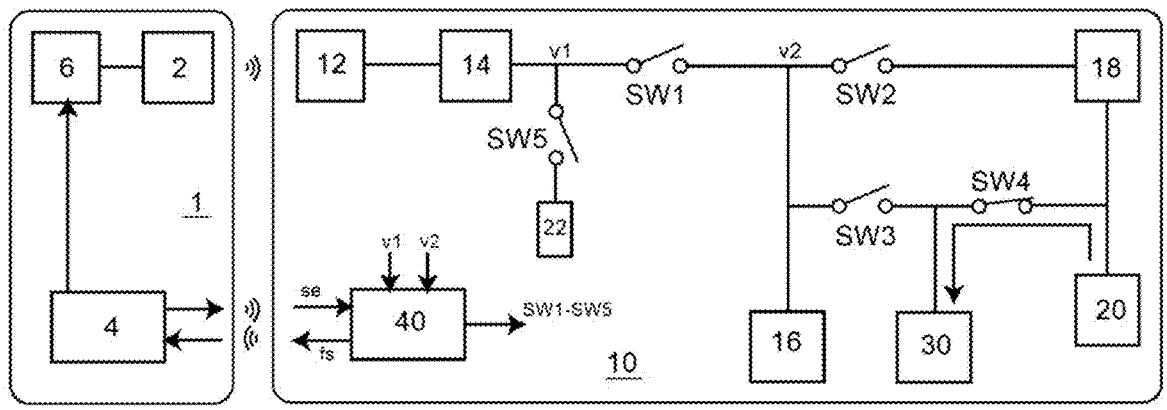
FIG. 8 is an example of a diagram illustrating a state 3 of the power-receiving circuit of FIG. 5 (example 1).

In the example of FIG. 8 (state 3), only the fourth switch SW4 is turned on, and all the other switches SW1 to SW3 are turned off. For example, this state corresponds to a state in which the power efficiency is poor, or the wireless power supply is not performed between the power-transmitting device and the power-receiving device. Because the battery 20 is already charged (the charge rate is not needed to be 100%), that power is allowed to be supplied to the sensor 30. In this state, especially, the third switch SW3 is turned off, so that the output of the rectifier 14 is not allowed to flow into the sensor 30. That is, the RF side and the DC side (especially, the sensor 30) are disconnected. Accordingly, the occurrence of impedance mismatching is prevented between the two sides.

Figure 9:
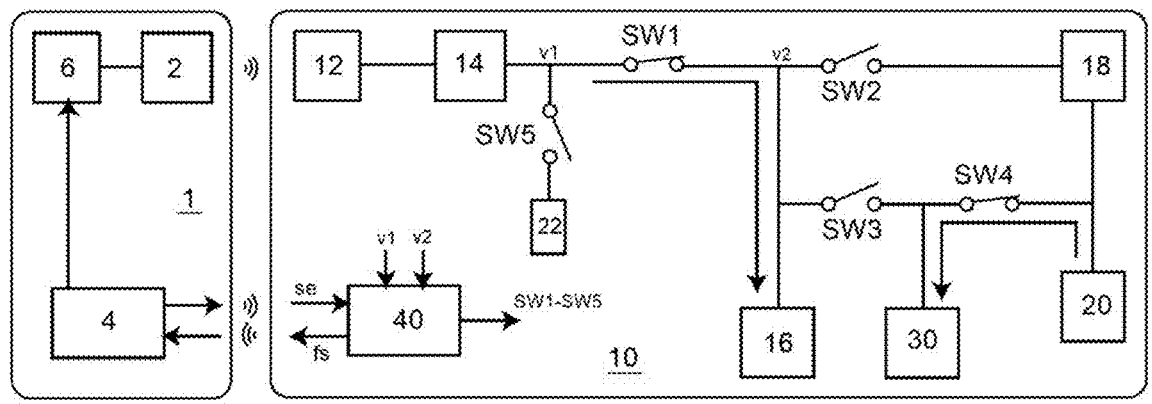
FIG. 9 is an example of a diagram illustrating a state 4 of the power-receiving circuit of FIG. 5 (example 1).

In the example of FIG. 9 (state 4), the first switch SW1 and the fourth switch SW4 are turned on, and all the other switches SW2 and SW3 are turned off. For example, this state corresponds to a state in which the power efficiency is good, and the capacitor 16 is charged by the electric power received by the power-receiving antenna 12 side. Because the battery 20 is already charged, that power is allowed to be supplied to the sensor 30. In this state, especially, the third switch SW3 is turned off, so that the output of the rectifier 14 is not allowed to flow into the sensor 30. That is, the RF side and the DC side (especially, the sensor 30) are disconnected. Accordingly, the occurrence of impedance mismatching is prevented between the two sides.

Figure 10:
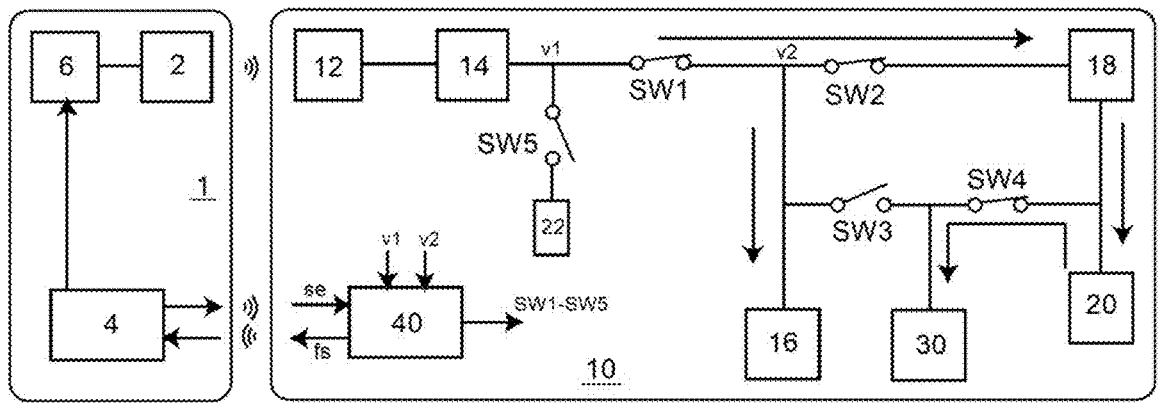
FIG. 10 is an example of a diagram illustrating a state 5 of the power-receiving circuit of FIG. 5 (example 1).

In the example of FIG. 10 (state 5), the first switch SW1, the second switch SW2 and the fourth switch SW4 are turned on, and only the third switch SW3 is turned off. For example, this state corresponds to a state in which the power efficiency is good, and the charge of the capacitor 16 is completed by the electric power received by the power-receiving antenna 12 side. The battery 20 is chargeable, and that power is allowed to be supplied to the sensor 30. In this state, especially, the third switch SW3 is turned off, so that the output of the rectifier 14 is not allowed to flow into the sensor 30. That is, the RF side and the DC side (especially, the sensor 30) are disconnected. Accordingly, the occurrence of impedance mismatching is prevented between the two sides.

Figure 11:
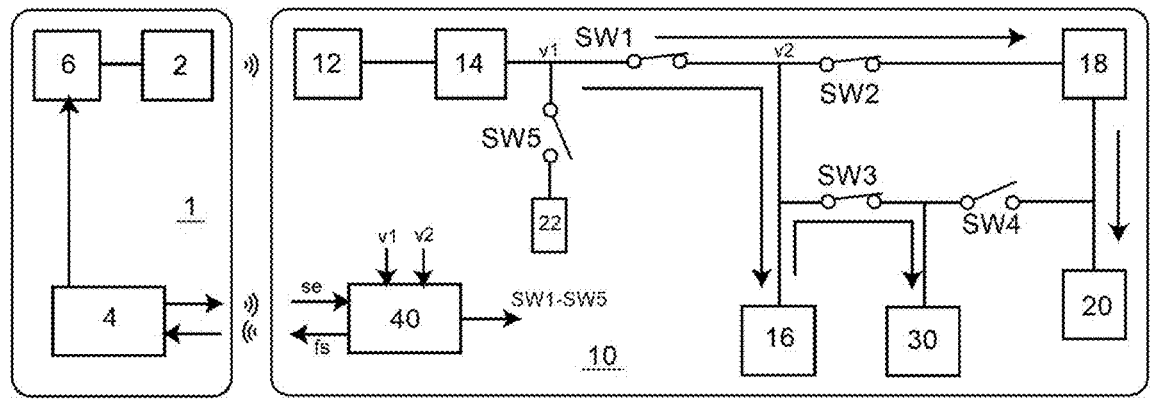
FIG. 11 is an example of a diagram illustrating a state 6 of the power-receiving circuit of FIG. 5 (example 1).

In the example of FIG. 11 (state 6), the first switch SW1 and the third switch SW3 are turned on. For example, this state corresponds to a state in which the power efficiency is good, and the capacitor 16 is charged by the electric power received by the power-receiving antenna 12 side, and then that power stored in the capacitor 16 is allowed to be supplied to the sensor 30. In this state, the sensor is charged by the electric power of the capacitor 16, not by the electric power of the battery 20. At this time, it is possible to turn off the second switch SW2. In this state, the first switch SW1 and the third switch SW3 are turned on, so that the output of the rectifier 14 is allowed to flow into the sensor 30. That is, the RF side and the DC side (especially, the sensor 30) are connected.

In the example of the state 6 illustrated in FIG. 11, the problem of impedance mismatching may occur because the RF side and the DC side (especially, sensor 30) are connected. However, this problem occurs only in the state 6 among all the exemplified states 1 to 6. Accordingly, by not selecting the state 6 or by limiting the frequency or duration of the state 6, it becomes possible to prevent or minimize the occurrence of impedance mismatching, as a whole.

The example of the state 6 illustrated in FIG. 11 has disadvantages as well as advantages. For example, by allowing the sensor 30 to be charged from both of the battery 20 and the capacitor 16, it becomes possible to provide a variation to the system. In addition, by selecting the state 6, it becomes possible to addresses the problem of charging loss with regard to the battery.

Therefore, in the present example, by controlling (or switching) the four switches SW1 to SW4 appropriately, the states of electric power in the power-receiving device 20 can be distinguished. As a result, it becomes possible to prevent or minimize the problem of degradation of power receiving efficiency due to the occurrence of impedance mismatching. Also, it becomes possible to address the problem of increase in the power consumption of the sensor system. In addition, it eliminates or minimizes the need for power supply wiring with regard to the sensor system. Furthermore, depending on the use condition, it becomes possible to supply electric power to the sensor 30 directly from the capacitor 16 instead of (or in addition to) supplying electric power to the sensor 30 from the battery 20. Therefore, users benefit from the reduced maintenance costs for the sensor system, the reduced cost price of the sensor system, and the reduced environmental devices associated with longer life of the system.

FIG. 29 illustrates a diagram to indicate each one of the states of the power-receiving circuit of the power-receiving device illustrated in FIG. 5.

In FIG. 29, the sensor 30 is in an off condition (or in a non-use condition) in the states 0 to 2, and the sensor 30 is in an on condition (or in a use condition) in the states 3 to 6. In each one of the states 0 to 6, especially, voltage-values v1, v2 positioned before and after the capacitor 16 are allowed to be sent to the controller 40.

Monitoring Power Receiving Condition

When electric power is transmitted wirelessly to the device 30 provided in the machine which is operated in FA, etc., the power-transmitting direction of the power-transmitting antenna 2 of the power-transmitting device 1 may not be optimized with the power-receiving direction of the power-receiving antenna 12 of the power-receiving device 10 (see reference symbol E in FIG. 1). In such a case, a condition in which sufficient electric power is not supplied may arise. For example, when the power-receiving antenna 12 is included in the robot arm and/or the robot hand, the position, the angle and/or the height, etc., of the power-receiving antenna 12 may be changed at a high degree of freedom along with the movement of the robot arm and/or the robot hand. In such a case, the power transmitting condition between the power-transmitting device 1 and the power-receiving device 10 may vary variously. Further, for example, it may not be possible to quickly comprehend the power receiving condition of the power-receiving device 10 in FA, etc.

It is possible to comprehend the power receiving condition of the power-receiving device 10 by using various means.

For example, when the time necessary for charging the capacitor 16 is short and electric power may be transmitted to the battery 20 in a short period of time, the controller 40 may comprehend the power receiving condition of the power-receiving device 10 according to the voltage values and the time. Because it means that as the time necessary for charging the capacitor 16 becomes shorter, the electric power to be received by the power-receiving antenna 12 becomes larger. On the contrary, it means that as the time necessary for charging the capacitor 16 becomes longer, the electric power to be received by the power-receiving antenna 12 becomes smaller. It is also possible to perform other electrical tests. In the example 1, the power-receiving device 10 is provided with a mean (SW5) for monitoring the power receiving condition of the power-receiving antenna 12 more quickly and easily.

With referring again to FIG. 5, the power-receiving circuit of the power-receiving device 10 further includes a switch SW5 for switching the distribution of electric power at the output side of the rectifier 14 (between the rectifier 14 and the first switch SW1), and a light emitting diode (LED) 22 functionally connected to the switch SW5, in addition to the above-mentioned four switches SW1 to SW4. For example, the switch SW5 is physically connected to the LED 22 by a cable or a connector, etc.

When the switch SW5 is turned on, the voltage at the side of the rectifier 14 is allowed to flow into the LED 22 through the switch SW5. The LED 22 is configured to light up when the electric power exceeds a predetermined value. The lighting of the LED 22 is made to be visually seen from the outside of the machine 100 (see FIG. 1). Therefore, based on the lighting of the LED 22, the user (for example, an inspector) is allowed to easily comprehend the power receiving condition of the power-receiving device 10 without performing an electric test.

The intensity of the light emitted by the LED 22 is roughly proportional to the quantity (amount) of the electric current which is allowed to flow into the LED 22. Preferably, the frequency or duration of the lighting of the LED 22 is made to be minimized as much as possible in order to avoid wasting power for performing wireless power supply. For example, in order to minimize the impact on the operation for supplying electric power, only the switch SW5 is turned on and the other switches SW1 to SW4 are turned off, before or after the use of the power-receiving device 10.

For example, with referring to FIG. 1, when the LED 22 of the power-receiving device 10 (see FIG. 5) is not turned on (or when the lighting of the LED 22 is weak), although energy E is transmitted from the power-transmitting device 1 to the power-receiving device 10, it can be inferred that the power-transmitting direction of the power-transmitting antenna 2 of the power-transmitting device 1, and the power-receiving direction of the power-receiving antenna 12 of the power-receiving device 10 are not suitably adapted with each other, or that the transmission of energy E is disturbed by any cause. In such a case, as described below, the beam forming of the power-transmitting antenna 2 of the power-transmitting device 1 may be performed. Or, two, three or more of the multiple beams of the power-transmitting antenna 2 may be split and emitted.

Example 2

Figure 12:
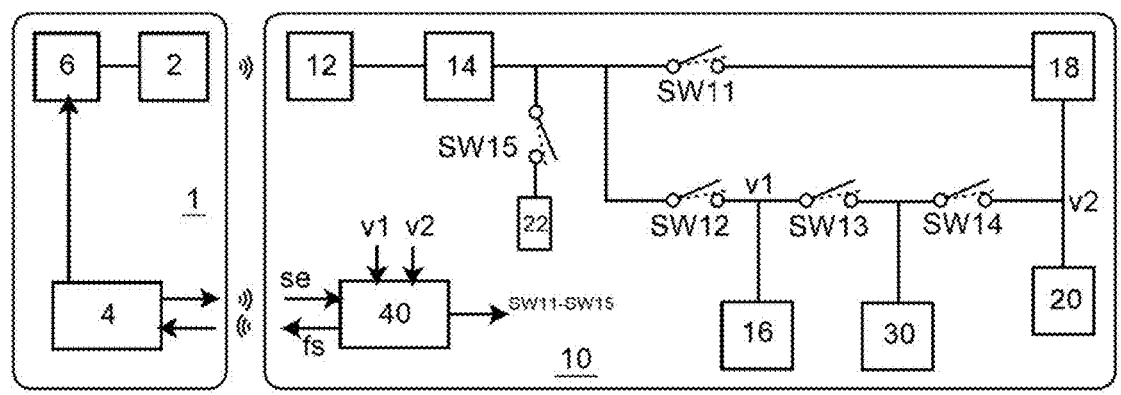
FIG. 12 is an example of a diagram illustrating a modification of the power-receiving circuit of FIG. 5 (example 2).
Figure 13:
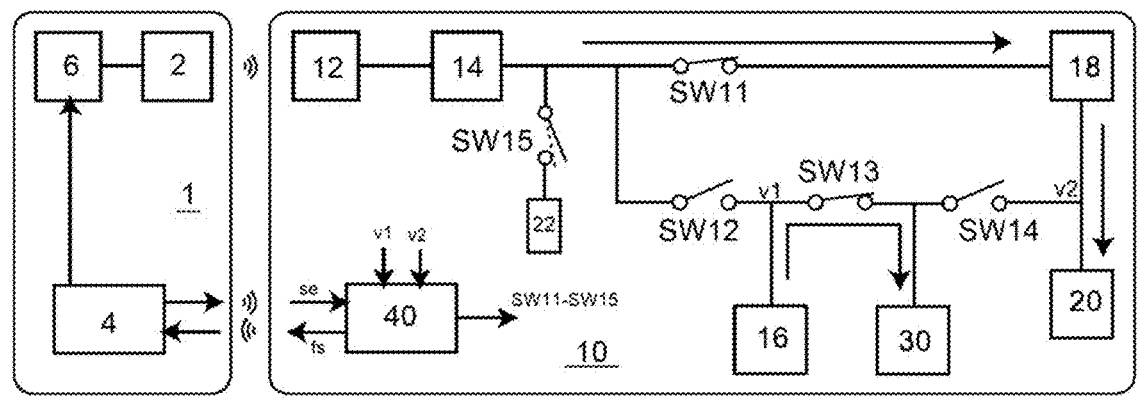
FIG. 13 is an example of a diagram illustrating a state 1 of the power-receiving circuit of FIG. 12 (example 2).
Figure 14:
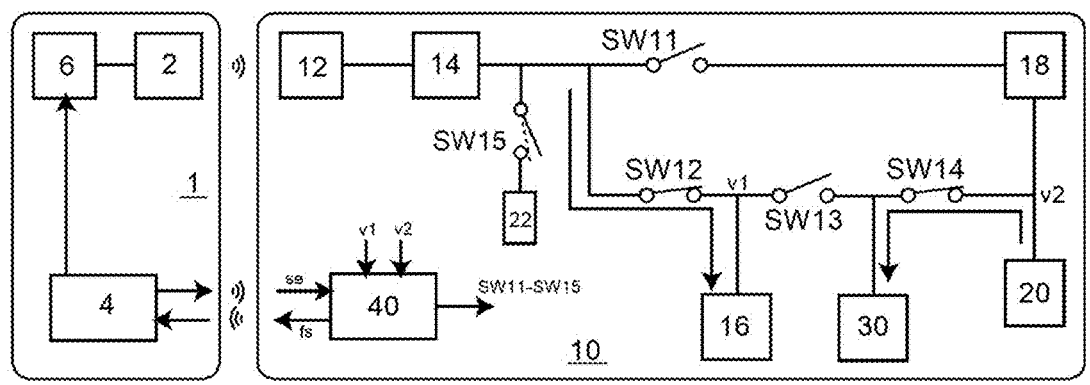
FIG. 14 is an example of a diagram illustrating a state 2 of the power-receiving circuit of FIG. 12 (example 2).

FIGS. 12 to 14 illustrate a second example in which partial amendments are made to the first example of the power-receiving device 10 illustrated in FIGS. 5 to 11.

Basically, the example 2 is configured similarly to the example 1, and only the arrangement of the four switches SW1 to SW4 of the example 1 and the control thereof are differed compared with the example 1. The other components of the power-transmitting device 1, the power-receiving device 10, and the machine 100 can be configured similarly to the first example. Therefore, the details of these components are omitted in order to avoid duplication of the description.

In the second example, the four switches SW11 to SW14 are arranged as follows.

The first switch SW11 is arranged so as to selectively interrupt the receiving of electric power between the rectifier 14 and the charger 18/the battery 20.

The second switch SW12 is arranged so as to selectively interrupt the receiving of electric power between the rectifier 14 and the capacitor 16.

The third switch SW13 is arranged so as to selectively interrupt the receiving of electric power between the capacitor 16 and the sensor 30.

The fourth switch SW14 is arranged so as to selectively interrupt the receiving of electric power between the battery 20 and the sensor 30.

In FIG. 12, the above-mentioned four switches SW11 to SW14 are arranged for switching the on state and the off state, as depicted by the solid lines and the dashed lines. In FIG. 12, all the four switches SW11 to SW14 are in the off state for interrupting the receiving of electric power. For example, this state corresponds to a state in which the power efficiency of the power-transmitting device 1 is poor, or the wireless power supply is not performed between the power-transmitting device 1 and the power-receiving device 10. In such a case, the output of the rectifier 14 does is not allowed to flow into the capacitor 16, the battery 20 and the sensor 30.

With referring to FIG. 13, in the state 1 of the example 2, only the first switch SW11 and the third switch SW13 are simultaneously turned on, and the second switch SW12 and the fourth switch SW14 are simultaneously turned off. For example, this state 1 corresponds to a state in which the power efficiency is good, and the battery 20 is charged by the electric power received by the power-receiving antenna 12 side. In addition, when the capacitor 16 is completely charged in advance, this state also corresponds to a state in which that electric power is supplied to the sensor 30. In this state, the output of the rectifier 14 is allowed to flow into only the battery 20, and is not allowed to flow into the capacitor 16 and the sensor 30. That is, the RF side and the DC side (especially, the sensor 30) are disconnected. Accordingly, the occurrence of impedance mismatching is prevented between the two sides.

With referring to FIG. 14, in the state 2 of the example 2, only the second switch SW12 and the fourth switch SW14 are simultaneously turned on, and the first switch SW11 and the third switch SW13 are simultaneously turned off. For example, this state 2 corresponds to a state in which the power efficiency is good, and the capacitor 16 is charged by the electric power received by the power-receiving antenna 12 side. In addition, when the battery 20 is completely charged in advance, this state also corresponds to a state in which that electric power is supplied to the sensor 30. In this state, the output of the rectifier 14 is allowed to flow into only the capacitor 16, and is not allowed to flow into the battery 20 and the sensor 30. That is, the RF side and the DC side (especially, the sensor 30) are disconnected. Accordingly, the occurrence of impedance mismatching is prevented between the two sides.

In the example 2, the state 1 in which the switch SW11 and the switch SW13 are simultaneously turned on (FIG. 13), and the state 2 in which the switch SW12 and the switch SW14 are simultaneously turned on (FIG. 14) are changed at appropriate times and periods. Accordingly, it becomes possible to flow the output of the rectifier 14 into one of the capacitor 16 and the battery 20 continuously, and to operate the sensor 30 by the other one of the capacitor 16 and the battery 20 which is charged. Thus, the output of the rectifier 14 is always used so that waste of energy is suppressed.

In the example 2, the two switches SW12 and SW13 are provided between the rectifier 14 and the sensor 30, and at least one of the two switches is in the off state, at all time. Accordingly, the output of the rectifier output 14 is not allowed to flow directly into the sensor 30. As a result, in the example 2, the state 6 (FIG. 11) of the example 1 does not occur. Therefore, the occurrence of impedance mismatching between the RF side and the DC side (especially, sensor 30) is prevented, all the time.

However, the states of the electric circuit illustrated in FIG. 12 are not limited to the cases illustrated in FIGS. 13 and 14. For example, it is possible to charge the capacitor 16 or the battery 20 by turning on only one of the switches SW11 and SW12 and by turning off all the other switches for a predetermined period.

Also, it is not always required to turn on the two switches illustrated in FIGS. 13 and 14 at exactly the same time. Depending on the use mode, it is possible to turn on the switch SW11 and the switch SW13 with a time difference. Also, it is possible to turn on the switch SW12 and the switch SW14 with a time difference.

In this example, the above-mentioned switch SW15 and the LED 22 are provided as means for monitoring the power receiving condition. In addition, the voltages v1, v2 in the power-receiving circuit are made to be sent to the controller 40.

Example 3

Figure 15:
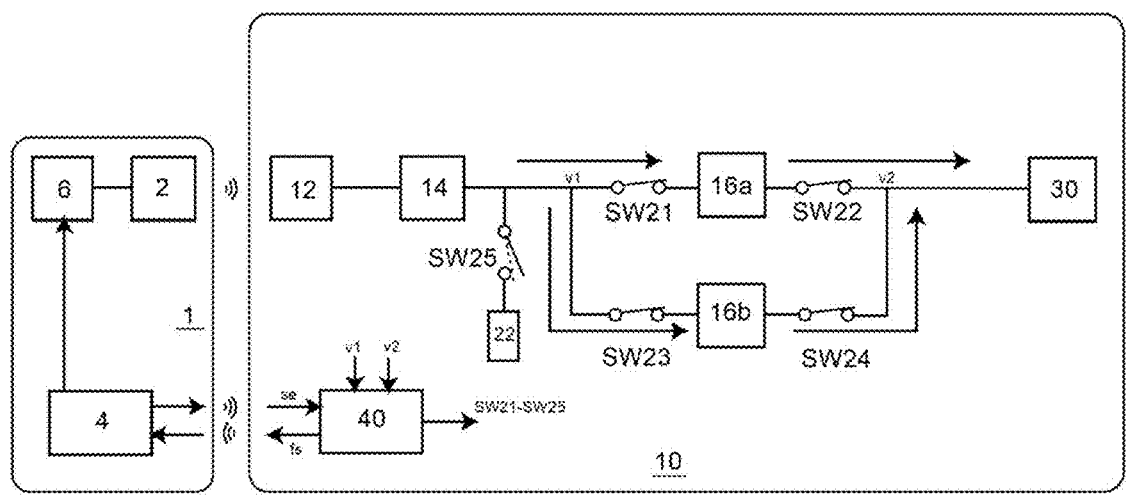
FIG. 15 is an example of a diagram illustrating a modification of the power-receiving circuit of FIG. 12 (example 3).

FIG. 15 illustrates a third example in which partial amendments are made to the second example of the power-receiving device 10 illustrated in FIGS. 12 to 14.

Basically, the example 3 is configured similarly to the example 2, only a combination of the capacitor 16 and the battery 20 of the example 2 is differed. The other components of the power-transmitting device 1, the power-receiving device 10, and the machine 100 can be configured similarly to the first example. Therefore, the details of these components are omitted in order to avoid duplication of the description.

In the example 2, electric power of the capacitor 16 to be charged is made to be used only for operating the sensor 30, and the electric power is not allowed to be used for charging the battery. The capacitor 16 and battery 20 are used to operate the sensor alternately (complementarily). Therefore, the capacitor 16 and the battery 20 both have a common function as a power storage device for storing electricity therein.

In the third example, the power-receiving device 10 includes a combination of the two capacitors 16a, 16b, instead of the combination of the capacitor 16 and the battery 20, as the battery managing system for supplying electric power to the sensor 30. Both of the capacitors 16a, 16b may be of the same type and/or capacitance. Alternatively, the capacitor 16a, 16b may vary in type and/or capacitance.

The four switches SW21 to SW24 are arranged as follows.

The first switch SW21 is arranged so as to selectively interrupt the receiving of electric power between the rectifier 14 and the capacitor 16a.

The second switch SW22 is arranged so as to selectively interrupt the receiving of electric power between the capacitor 16a and the sensor 30.

The third switch SW23 is arranged so as to selectively interrupt the receiving of electric power between the rectifier 14 and the capacitor 16b.

The fourth switch SW24 is arranged so as to selectively interrupt the receiving of electric power between the capacitor 16b and the sensor 30.

According to the example 2, by turning on one set of the two switches simultaneously, and by turning off the remaining set of the other two switches simultaneously, only one of the two power storage devices 16 and 20 is made to be charged, and the other power storage devices is used to supply electric power to the sensor 30.

According to the example 3, the four switches SW21 to SW24 may be turned on and off in various combination for charging the one or both of the two capacitors 16a, 16b and for supplying that electric power to the sensor 30.

For example, any state may be selected among the below-mentioned states 0 to 6.

In a state 0, all the four switches SW21 to SW24 are turned off.

In a state 1, only the switch SW21 is turned on for charging only the capacitor 16a.

In a state 2, only the switches SW21 and SW22 are turned on for supplying the sensor 30 with the electric power of the capacitor 16a.

In a state 3, only the switch SW23 is turned on for charging only the capacitor 16b.

In a state 4, only the switches SW23 and SW24 are turned on for supplying the sensor 30 with the electric power of the capacitor 16b.

In a state 5, only the switches SW21 and SW23 are turned on for charging the capacitors 16a and 16b.

In a state 6, all the switches SW21 to SW24 are turned on for supplying the sensor 30 with the electric power of the capacitors 16a and 16b.

As illustrated in the examples 1, 2, when the battery 20 is used as the power storage device, electric power to be stored in the battery may be limited to 2V or 4V. On the contrary, as illustrated in the example 3, when the capacitors 16a, 16b are used as the power storage devices, electric power to be stored in the capacitors may be, for example, 5V or less. Therefore, in a case when electric power is supplied from the capacitor(s) to the sensor 30, there is an advantage that it is resistant to over discharge, in comparison with the case when electric power is supplied from the battery to the sensor 30. Accordingly, the example 3 can be considered when electric power necessary for charging the sensor 30 is relatively small and a means for addressing the over discharge is required.

Besides, in the example 3 illustrated in FIG. 15, the two capacitors 16a, 16b are used in parallel. In the other example, it is possible to use three or more of the capacitors in parallel. Also, in the other example, it is possible to used two or more of the capacitors in series. However, when capacitors are arranged in series (for example, in a two-stage configuration in line), attention should be paid to the connection direction, because there is a possibility of leading to breakage of the capacitors when the capacitors have polarities.

Example 4

Figure 16:
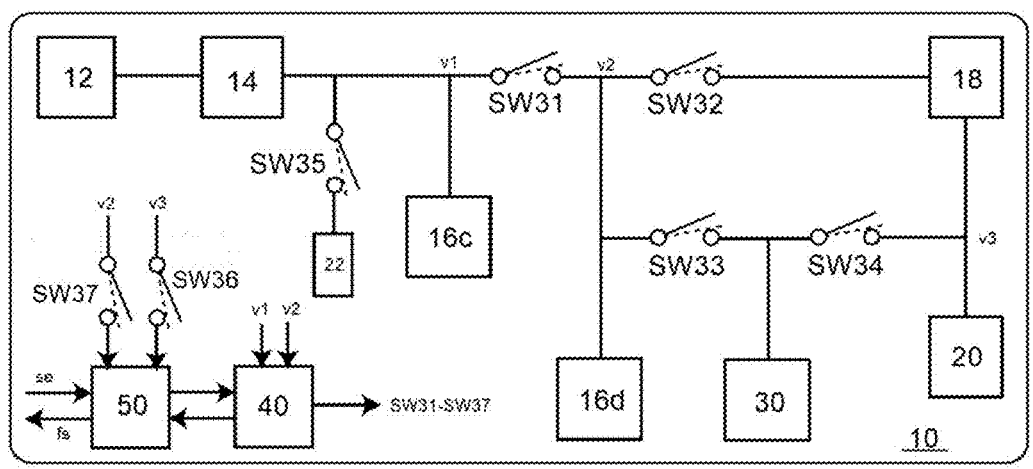
FIG. 16 is an example of a diagram illustrating a modification of the power-receiving circuit of FIG. 5 (example 4).

FIG. 16 illustrates a fourth example in which partial amendments are made to the first embodiment of the power-receiving device 10 illustrated in FIG. 5.

Basically, the example 4 is configured similarly to the example 1, and as a difference, the first power storage device 16 is changed from the one capacitor 16 to two capacitors 16c, 16d. The other components of the power-transmitting device 1, the power-receiving device 10, and the machine 100 can be configured similarly to the first example. Therefore, the details of these components are omitted in order to avoid duplication of the description.

With referring to FIG. 16, it is depicted that the capacitor 16c is provided on the downstream side of the rectifier 14 and on the upstream side of the first switch SW31. The capacitor 16c is always connected with the rectifier 14, but it does not generate problems in terms of the function of the capacitor 16c. The capacitor 16d is provided on the downstream side of the first switch SW31 and on the upstream side of the sensor 30.

The four switches SW31 to SW34 are arranged as follows.

The first switch SW31 is arranged so as to selectively interrupt the receiving of electric power between the rectifier 14 (capacitor 16c) and the capacitor 16d.

The second switch SW32 is arranged so as to selectively interrupt the receiving of electric power between the capacitor 16d and the charger 18/battery 20.

The third switch SW33 is arranged so as to selectively interrupt the receiving of electric power between the capacitor 16d and the sensor 30.

The fourth switch SW34 is arranged so as to selectively interrupt the receiving of electric power between the battery 20 and the sensor 30.

In the power-receiving circuit of the fourth example illustrated in FIG. 16, the output of the rectifier 14 flows into the capacitor 16c first. Further, the electric power stored in the capacitor 16c is made to be stored in the battery 20 or the capacitor 16d. Then, the sensor 30 is supplied with electric power by the power storage device 20, 16d. In each state, the switches SW31 to SW34 can be operated in order to prevent the occurrence of impedance mismatching due to the connection between the side of the rectifier 14 and the side of the sensor 30.

By appropriately switching the above-mentioned four switches SW31 to SW34, the state of the charging circuit of the power-receiving device 20 is changed variously.

In particular, in the power-receiving circuit of the fourth example illustrated in FIG. 16, two capacitors 16c, 16d are provided separately from the battery 20. Accordingly, it becomes possible to optimize the charging of the battery 20 and the supplying energy to the sensor 30 by using the two capacitors 16c, 16d.

FIG. 30 illustrates a diagram to indicate the states when the four switches SW 31 to SW 34 illustrated in FIG. 16 are changed.

Similarly, in the fourth example, the above-mentioned switch SW35 and the LED 22 are provided in order to visually confirm the power receiving condition of the power-receiving device 10 so that the operator can comprehend the receiving condition of the radio wave.

In addition, switches SW36, SW37 are provided for sending the voltage values v2, v3 of the power-receiving device 10 to the radio communication IC. These voltage values are detected by VD (Voltage Detector) or the like.

With referring to FIG. 30, in the state 0, all switches SW31 to SW37 are turned off. This state corresponds to a state in which radio waves are not transmitted from the power-transmitting device 1, or the power receiving condition of the power-receiving device 10 is poor. Or, this state corresponds to a state in which only the switch SW35 is turned on in order to confirm the power receiving condition of the power-receiving device 10.

Accordingly, the power storage device (or capacitor) 16c is always connected with the rectifier 14, so that it can be always charged. The stored electric power is not allowed to flow into the other elements such as the power storage device (or capacitor) 16d, the power storage device (or battery) 20, etc.

In the state 1, only the switch SW31 is turned on, and all the other switches SW32 to SW37 are turned off. This state corresponds to a state in which the power efficiency is good when electric power is transmitted from the power-transmitting device 1 to the power-receiving device 10. Also, this state corresponds to a state in which electric power stored in the power storage device 16c is allowed to flow into the power storage device 16d, but the power storage device 16d is not yet sufficiently charged. In a case where the power storage device 16d is provided as a capacitor, a time period necessary for charging it can be short.

In the state 2, only the switch SW32 is turned on, and all the other switch SW31, and SW33 to SW37 are turned off. This state corresponds to a state in which power efficiency is good when electric power is transmitted from the power-transmitting device 1 to the power-receiving device 10. Also, this state corresponds to a state in which the power storage device 16d is sufficiently charged by electric power stored in the power storage device 16c, and the stored electric power is allowed to flow into the power storage device 20.

In general, the battery 20 is capable of storing more electric power therein comparing to the capacitor 16d. Hence, the above-mentioned states 1 and 2 may be repeated to repeat the charging and the supplying electric power of the capacitor 16c, 16d until the battery 20 is fully charged.

In the states 1 and 2, the sensor 30 is in the off state. In the state 3 and later, the sensor 30 is in the on state.

In the state 3, only the switch SW34 is turned on, and all the other switch SW31 to SW33 and SW35 to SW37 are turned off. This state corresponds to a state in which the sensor 30 is charged by electric power stored in the battery 20. Also, this state corresponds to a state in which the capacitor 16c is charged by the output of the rectifier 14.

In the state 4, only the switches SW31 and SW34 are turned on, and all the other switches SW32, SW33 and SW35 to SW37 are turned off. This state corresponds to a state in which electric power stored in the power storage device 16c is allowed to flow into the power storage device 16d, and the sensor 30 is supplied with electric power stored in the power storage device 20.

Again, the above-mentioned states 3 and 4 may be repeated to repeat the charging and transmitting electric power of the capacitors 16c, 16d.

In the state 5, only the switch SW33 is turned on, and all the other switch SW31, SW32, and SW34 to SW37 are turned off. This state corresponds to a state in which the sensor 30 is supplied with electric power stored in the power storage device (or, capacitor) 16d. At this time, the switch SW31 is turned off, so that the output of the rectifier is not allowed to flow into the sensor 30. As a result, the RF side and the DC side are not directly connected. That is, in this case, the occurrence of impedance mismatching is prevented due to a direct connection between the side of the rectifier 14 and the side of the sensor 30, as the above-mentioned state 6 of the example 1 (see FIG. 11).

From the state 0 to the state 5, the radio communication IC is in the off state. In the state 6 and later, the radio communication IC is in the on state.

In the state 6, only the switches SW34, SW36 are turned on, and all the other switches SW31 to SW33, SW35, and SW37 are turned off. This state corresponds to a state in which the radio communication IC 50 is supplied with electric power from the power storage device (or, battery) 20, in the state 3. This value is made to be sent to the controller 40 of the power-receiving device 10 and to the controller (host computer) 4 of the power-transmitting device 1.

Incidentally, the controller 40 is capable of having a function of radio communication. Also, it is possible to include the radio communication IC 50 in the controller 40. Basically, either one or both of the controller 40 and the radio communication IC 50 have a function of the radio communication of the present invention.

By combining either one or both of the controller 40 and the radio communication IC 50 with the sensor 30, it becomes possible to transmit the detection results of the sensor 30 to the outside. However, in a case when a SAW sensor is used as the sensor 30, the detection results of the sensor 30 may be transmitted to the outside by the function of the radio communication provided in the SAW sensor without using the controller 40 and/or the radio communication IC 50. In this manner, the power-receiving device 10 may be configured to supply electric power necessary for the function of the radio communication in addition to the electric power necessary for operating the device 30.

In the state 7, only the switches SW31, SW34, and SW36 are turned on, and all the other switches SW32, SW33, SW35, and SW37 are turned off. This state corresponds to a state in which electric power is supplied from the power storage device (or, battery) 20 to the radio communication IC 50, in the state 4. This value is made to be sent to the controller 40 of the power-receiving device 10 and the controller 4 of the power-transmitting device 1.

In the state 8, only the switches SW33 and SW37 are turned on, and all the other switches SW31, SW32, and SW34 to SW36 are turned off. This state corresponds to a state in which electric power is supplied from the power storage device (or, capacitor) 16d to the radio communication IC 50, in the state 5. This value is made to be sent to the controller 40 of the power-receiving device 10 and the controller 4 of the power-transmitting device 1.

In any one of the states 1 to 8, the output of the rectifier is not allowed to flow into the sensor 30 directly so that the RF side and the DC side are not connected directly. Accordingly, the occurrence of impedance mismatching is prevented between the RF side and the DC side (particularly, the sensor 30).

Also, the voltage values sent to the radio communication IC 50 in the states 6 to 8 are used by the controller 40 and/or the controller 4 in order to comprehend the power receiving condition of the power-receiving device 10.

In the example 4 illustrated in FIG. 16, three power storage devices 16c, 16d, and 20 are provided. Preferably, two (i.e. 16c, 16d) of the three devices are capacitors having high-capacities and the other one (i.e. 20) is a battery. However, according to the use state, all of the three devices may be provided as capacitors (not shown).

Similarly, the details of the power-receiving circuit based on the controlling of the switches SW31 to SW37 can be referred to FIG. 30.

Example 5

Figure 17:
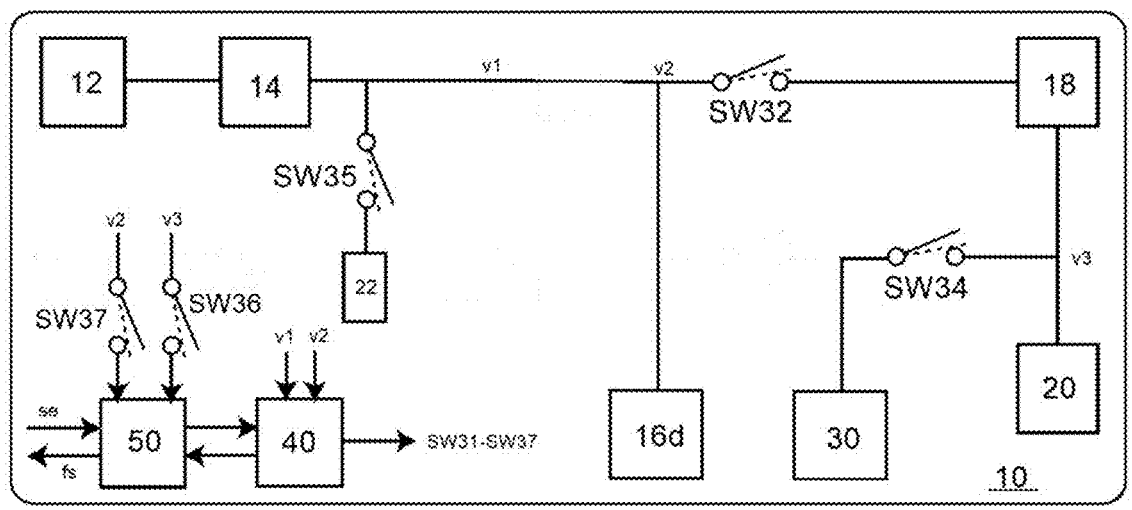
FIG. 17 is an example of a diagram illustrating a modification of the power-receiving circuit of FIG. 16 (example 5).

FIG. 17 illustrates a fifth example in which partial amendments are made to the fourth example of the power-receiving device 10 illustrated in FIG. 16.

Basically, the example 5 is configured similarly to the example 4, and as a difference of the constituent elements, only the capacitor 16 and the switches SW31, SW33 are omitted. The other components of the power-transmitting device 1, the power-receiving device 10, and the machine 100 can be configured similarly to the fourth example. Therefore, the details of these components are omitted in order to avoid duplication of the description.

In the fifth example, a combination of one capacitor 16c and the battery 20 is used as the power storage device, and the number of switches included in the power-receiving circuit is minimized. Therefore, it becomes possible to minimize the mounting area of the power-receiving device 10. In addition, it becomes possible to avoid the complication of the control thereof. Further, it becomes possible to suppress the operation cost thereof. Furthermore, the power-receiving circuit is configured to prevent the occurrence of impedance mismatching while satisfying the requirements of the actual use, by eliminating the switches SW31, SW33.

In general, as the number of the elements requiring the operation of switches or the like becomes bigger in the electric circuit of the power-receiving device 10, electric power consumption becomes bigger, as a whole. Although electric power required for the operation of the switch is small, the amount of electricity to be transmitted wirelessly is limited. Accordingly, it is not preferable that the amount of power consumption is increased without contributing to the charging of the sensor. Also, in general, it is not preferable that the control of the power-receiving device 10 becomes complicated due to the increase in the number of constituent elements. Therefore, the fifth example is configured to achieve compatibly both of the dealing with the impedance mismatching and the simplifying of the control of the power-receiving circuit.

That is, unlike the examples 1 to 4, the example 5 is configured to ignore the occurrence of impedance mismatching as long as it occurs in the range of from 5% to 10% of the overall and the effects caused by the occurrence is small. The objective is to suppress its execution cost by performing the control of the simplified power-receiving circuit, instead of performing the control of the complicated power-receiving circuit which is configured to completely prevent the occurrence of impedance mismatching to 100%.

In the power-receiving circuit of the example 5 illustrated in FIG. 17, the output of the rectifier 14 first flows into the capacitor 16d. At this time, a switch for switching distribution of electric power between the rectifier 14 and the capacitor 16d is omitted. Therefore, the capacitor 16d is provided to be charged continuously, but it may cause no inconvenience particularly.

The switch SW32 is provided between the capacitor 16d and the battery 20 (charger 18) in order to change a state in which the capacitor 16d is charged and a state in which the battery 20 is charged with that stored electric power.

Accordingly, the switch SW32 is made to be turned off while the capacitor 16d is charged, and then once the capacitor 16d is charged, the switch SW32 is made to be turned on while that electric power is transmitted to the battery 20.

The switch SW34 is provided between the battery 20 and the sensor 30 in order to change a state in which the battery 20 is charged and a state in which the sensor 30 is supplied with the stored electric power.

Accordingly, the switch SW34 is made to be turned off while the battery 20 is charged, and then once the battery 20 is charged, the switch SW34 is made to be turned on while that electric power is transmitted to the sensor 30.

Example 6

Figure 18:
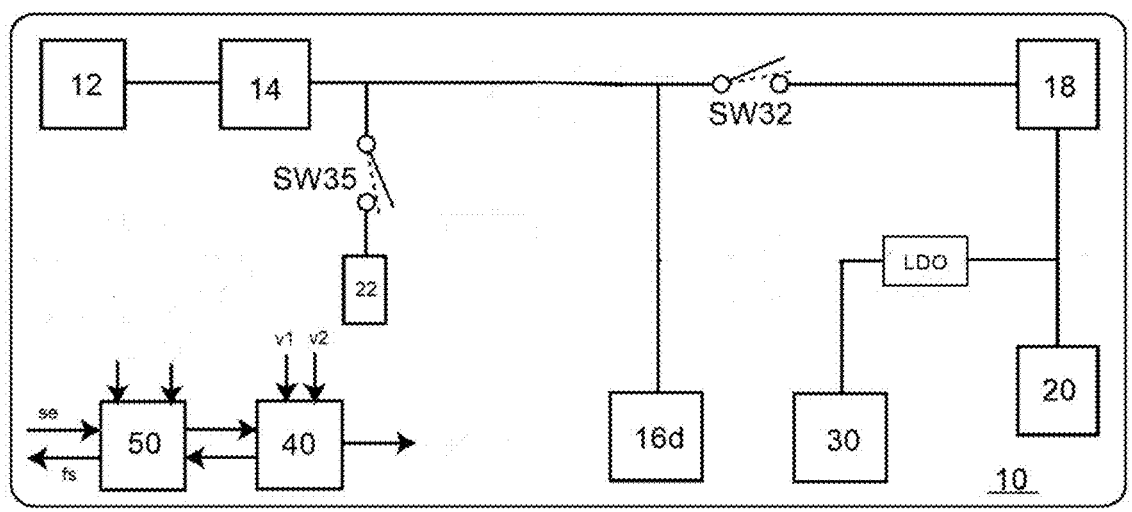
FIG. 18 is an example of a diagram illustrating a modification of the power-receiving circuit of FIG. 17 (example 6).

FIG. 18 illustrates a sixth example in which partial amendments are made to the fifth example of the power-receiving device 10 illustrated in FIG. 17.

Basically, the example 6 is configured similarly to the example 5, and only a change from the switch SW34 to a LTO is different. The other components of the power-transmitting device 1, the power-receiving device 10, and the machine 100 can be configured similarly to the example 4. Therefore, the details of these components are omitted in order to avoid duplication of the description.

In the sixth example, a LDO is provided between the battery 20 and the sensor 30, instead of the switch SW34. Thus, it is constituted to change a state in which the battery 20 is charged and a state in which the sensor 30 is supplied with that stored electric power, by operating the LDO, without using a mechanical switch.

In the example 6, as in the case of the example 5, the objective is to suppress its execution cost by performing the control of the simplified power-receiving circuit, instead of performing the control of the complicated power-receiving circuit which is configured to completely prevent the occurrence of impedance mismatching to 100%.

The LDO is also known as a regulator having low loss. This is a series regulator which is capable of operating with extremely small difference between the input voltage and the output voltage. By operating the LDO, virtually the same function as the switch may be achieved.

Optimizing Impedance Matching

In each case of the above-mentioned electric circuits of the examples 1 to 6, it is possible to further optimize the impedance matching.

In FIG. 19, an example of optimizing of the impedance matching of electric circuit is schematically depicted. In this figure, values of input power are depicted on the horizontal axis, and values of the efficiency of the power-receiving circuit are depicted on the vertical axis.

As illustrated in (1) of FIG. 19, when the RF area and the DC area are connected to each other in the power-receiving circuit of the power-receiving device 10, an impedance mismatching occurs with degrading the efficiency of the circuit.

As illustrated in (2) of FIG. 19, when the occurrence of the impedance mismatching is avoided in the above-mentioned case, it becomes possible to improve the deterioration in efficiency.

However, even in this case, it will be difficult to achieve high efficiency unless the optimization of the impedance matching is carried out, as illustrated in (3) of FIG. 19.

Therefore, the present example may be provided with not only the means for avoiding the occurrence of the impedance mismatching, but also the means for optimizing the impedance matching.

With referring to FIGS. 20 (A) and 20 (B), the means for optimizing the impedance matching is exemplified. Incidentally, in FIG. 20 (B), the electric circuit is roughly depicted for explanation. However, the below-mentioned description for the figure is applicable to each one of the above-mentioned examples (in particular, to the examples 5 and 6).

The electric circuit which is roughly depicted in FIG. 20 (B) is configured to include a rectifier, a switch, a power storage device (for example, a capacitor) as indicated by the reference symbol Z1, and a power supply circuit and a device (for example, a sensor) as indicated by the reference symbol Z2, both of which form a combined impedance.

In a condition illustrated in FIG. 20 (B), the switch is in an off position for not performing distribution of electric power. In this case, the output of the rectifier is connected to only the impedance Z1 of the capacitor.

With respect to the condition illustrated in FIG. 20 (B), once the switch is changed to an on position for performing distribution of electric power, the output of the rectifier is connected not only to the impedance Z1 of the capacitor, but also to the combined impedance Z2 of the power supply circuit and the sensor, in parallel.

The left side of FIG. 20 (A) illustrates the impedance Za when the switch is turned on. In this case, the impedance mismatching occurs so that electric power has a low value.

The right side of FIG. 20 (A) illustrates the impedance Zc when the switch is turned off (Zc=Z1). In this case, the impedance mismatching is not allowed to occur, but the impedance is not optimized. Supposing that the impedance is made to be a value of Zb when it is optimized, then, the value of Zc is made to be larger than Za, but is made to be smaller than Zb.

Supposing that a ratio is made to be "D"% when the switch is turned on, and the ratio is made to be "1-D"% when the switch is turned off, and then, the load impedance Z of the rectifier may be defined as below:

$$Z=(Z1//Z2)\times(1-D)+Z1\times D$$

In the above equation, the symbol of the parallel operator, or the two vertical lines (//) indicates a mathematical expression of parallel computing in a simplified manner. For example, when conducting the parallel computing of resistances, by using the expression of "R1//R2", it is possible to express the mathematical expression of "1/(1/R1+1/R2)" in the same way.

With referring to FIG. 20 (B), when the switch is turned on and off at a high speed, a state in which the impedance is represented by only Z1 and a state in which Z1 and Z2 are connected in parallel are switched alternately, on appearance, with regard to the rectifier. At this time, a period of time during which Z2 is connected is adjusted. For example, the switch is turned on and off, in milliseconds. As a result, the impedance with regard to the rectifier can appear to draw a curve of a chevron or a mountain-shaped curve (convex), as schematically illustrated in FIG. 20 (A). This figure is confirmed on the basis of computer simulations.

Accordingly, by turning on and off the switch at a high speed so as to adjust the impedances, with regard to Z1 and Z2, as schematically illustrated in FIG. 20 (A), it becomes equivalent to change the impedances as shown by Za, Zb, and Zc. By adjusting the on/off ratio of the switch at that time, it becomes possible to generate the impedance of Zb, on appearance, with regard to the rectifier. Then, it is conceivable that the output power may be maximized. Here, the power required for moving the switch at high speed will be about microwatts so that the power loss due to the operating of the switch will be small.

Accordingly, the present example is capable of optimizing the impedance matching by adjusting the times necessary for charging the capacitor and the Duty ratio to be connected to the power supply circuit. In this way, it is possible to adapt a method of averaging state (or a state averaging method) for obtaining the equivalent impedances for Z1 and Z2. By means of this, the present example is capable of avoiding the occurrence of impedance mismatching by simply controlling the switch, and of optimizing the impedance matching by turning on and off the switch at a high speed so as to average the impedance, on appearance, with regard to the rectifier.

In particular, in the above-mentioned electric circuits illustrated in the examples 5 and 6, by adapting the state averaging method, it becomes possible to improve the efficiency of the power-receiving circuits of the power-receiving device, as a whole.

In a case when the electric circuit illustrated in FIG. 20 (B) is applied to the power-receiving circuits of the examples 5 and 6 illustrated in FIGS. 16 and 17, it is possible to change the wiring of the electric circuits for connecting the capacitor and the sensor to the rectifier in parallel.

In this way, by turning on and off the second switch SW32 (see FIGS. 16 and 17) at a high speed, so as to appropriately determine the on/off ratio of the second switch SW32, it becomes possible to optimize the impedance by adapting the state averaging method to the relatively large resistance and the relatively small resistance (Z1, Z2), with regard to the rectifier.

In addition, when the electric circuit illustrated in FIG. 20 (B) is applied to the examples 1 to 6, it is possible to modify the electric circuit according to the use mode. For example, in the electric circuit of FIG. 20 (B) for exemplifying the optimizing of the impedance matching, it is possible to use a DC-DC converter for the element of Z2. In this case, by adjusting two impedances in the DC-DC converter by using the switch, it becomes possible to optimize the impedance matching. Here, the "DC-DC converter" is an element which is capable of converting a direct current to a direct current, and this element is used for converting it to a required voltage or for stabilizing it. In addition, there may be a case in which a LDO or a sensor is connected to the element of Z2. In such a case, the LDO may be used as a switch.

Optimizing of Power Receiving Condition

It is also possible to observe the electric field strength (or electric field intensity) in each one of the above-mentioned electric circuits of the examples 1 to 6.

For example, in the electric circuit of the first example illustrated in FIG. 5, it is possible to turn on only the switch SW5 for observing the lighting condition of the LED 22. As a result, the user is allowed to comprehend the power supplying condition.

Further, in each one of the examples 1 to 6, it is also possible to send voltage values in the power-receiving circuit as feedback signals to the power-transmitting device 1. As a result, the power-receiving device is allowed to comprehend the power supplying condition of the power-receiving device 10. Furthermore, it becomes possible to optimize the power supplying condition of the power-receiving device 10 based on the feedback signals.

The feedback control method described below is adaptable to each one of the examples 1 to 6. Hereinafter, it will be described based on the power-receiving circuit of the example 4 illustrated in FIG. 16.

For example, in the power-receiving circuit of FIG. 16, it is supposed that a value of electric power transmitted to the first capacitor 16c at the upstream side of the first switch SW31 is made to be v1, and a value of electric power transmitted to the second capacitor 16d at the downstream side of the first switch SW31 is made to be v2.

Figure 21:
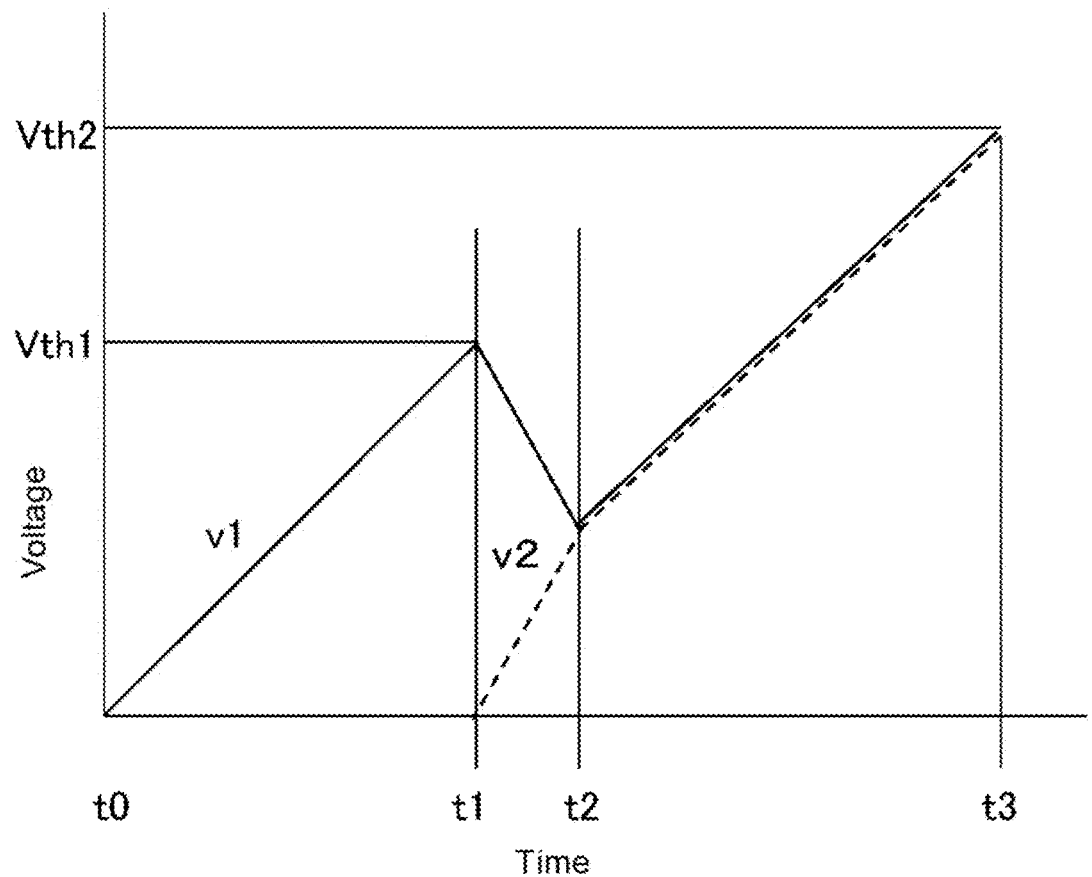
FIG. 21 is an example of a diagram schematically illustrating voltage values of the power-receiving circuit of FIG. 16.

FIG. 21 schematically illustrates the change of the voltages in this case.

In the graph of FIG. 21, the voltage values v1, v2 in the power-receiving circuit of the example 4 illustrated in FIG. 16 are depicted on the vertical axis, and a time is depicted on the horizontal axis.

In FIG. 21, it is depicted that, from time t0 to time t1, all of the switches SW31 to SW 35 of the power-receiving circuit of the example 4 illustrated in FIG. 16 are turned off so that this state corresponds to a state in which all of the energy outputting from the rectifier 14 is allowed to flow into the first capacitor 16c. During this period of time, the voltage value v1 of the first capacitor 16c continues to rise.

At time t1, when the voltage value v1 of the first capacitor 16c reaches Vth1, the switch SW31 is turned on. The Vth1 is a threshold value for turning on the switch SW31. At this time, the first capacitor 16c is sufficiently charged. Incidentally, the actual values of the Vth1 and t1 can be varied according to the kind of the capacitor 16c to be used.

When the switch SW31 is switched from the off state to the on state at time t1, the energy stored in the first capacitor 16c is allowed to flow into the second capacitor 16d. During a period of time from t1 to t2, the amount of electric power to be stored in the second capacitor 16d continues to rise.

The state at t2 corresponds to a state in which voltage values of v1 is supplied to v2 so that both of them become the same value. Subsequently, during a period of time from t2 to t3, the voltage value v2 of the second capacitor 16d continues to rise.

At time t3, when the voltage value v2 of the second capacitor 16d reaches Vth2, the switch SW31 is turned on. The Vth1 is a threshold value for turning on the switch SW32. At this time, the second capacitor 16d is sufficiently charged. Incidentally, the actual values of the Vth2 and t2 can be varied according to the kind of the capacitor 16d to be used.

With referring to FIG. 21, by observing the period of time from t1 to t3, it becomes possible to observe the pseudo power-receiving strength of the power-receiving device 10. Here, the period of time from t1 to t2 is not used for observing the power receiving strength. This period is depicted to bring the graph of FIG. 21 closer to the actual voltage waveform in some applications.

The voltage values v1 and v2 are sent to the controller 40 of the power-receiving device 10. The controller 40 is capable of observing the pseudo power-receiving strength at this time by measuring the time from Vth1 to Vth2 for determining the speed at which v2 rises.

Accordingly, the controller 40 send these values as feedback signals fs to the power-transmitting device 1. The power-transmitting device 1 is capable of observing the pseudo power-receiving strength of the power-receiving device 10 according to the values of the feedback signals fs. Based on the results, the controller 4 of the power-transmitting device 1 is capable of performing a control for optimizing the power-transmitting direction of the power-transmitting antenna 2

In this way, the pseudo electric field strength is observed by using the speed at which the v2 rises. It is also possible to observe the power receiving condition of the power-receiving device 10 by using the values of v1, v2 and v3 (see FIG. 16).

Figure 22:
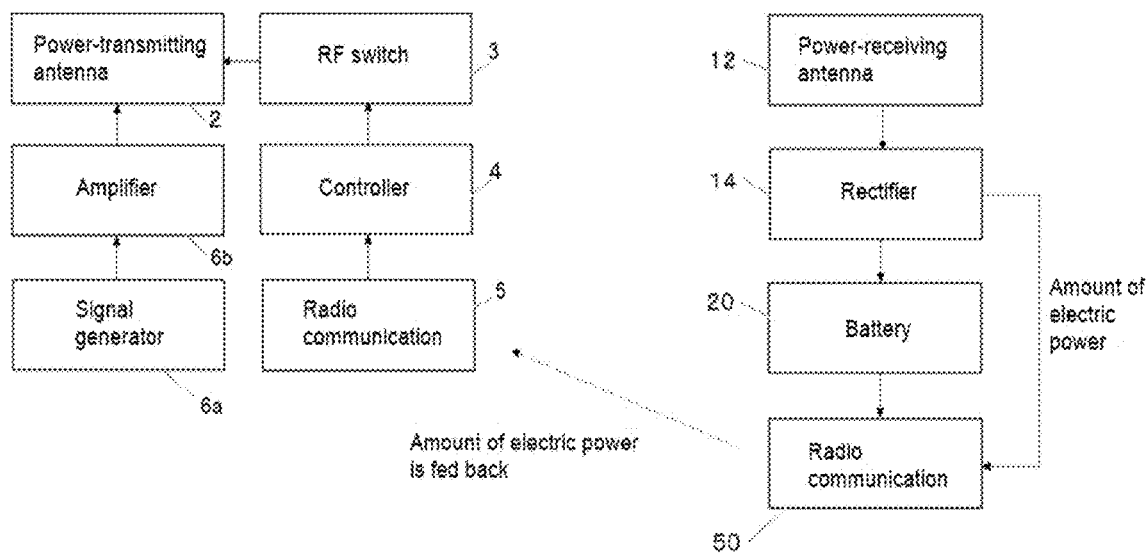
FIG. 22 is an example of a diagram schematically illustrating a flow of the feedback of the power receiving condition.

FIG. 22 illustrates a flow diagram for sending the feedback signals fs from the power-receiving device 10 to the power-transmitting device 1.

As illustrated on the right side of FIG. 22, in the power-receiving device 10, the energy received by the power-receiving antenna 12 is transmitted to the rectifier 14. Subsequently, it is transmitted to the battery 20. At this time, the values such as v1, v2 are sent to the controller 40 of the power-receiving device 10. These values are sent to the power-transmitting device 1 as feedback signals fs by a radio communication IC 50 which is connected to the controller 40.

Incidentally, the power-receiving antenna 12 is configured to be capable of appropriately receiving electric power in a three-dimensional space, as described above (see FIGS. 3 and 4). Therefore, when the power receiving condition is not good, the control of the power-transmitting antenna 2 will be effective for optimizing the condition of the wireless power supply.

As illustrated in the center of FIG. 22, a radio communication 5 is provided to be connected with the controller 4 of the power-transmitting device 1, and it is configured to send the above-mentioned feedback signals fs to the controller 4.

As illustrated on the left side of FIG. 22, the power-transmitting device 1 is provided with a power transmitting circuit having a signal-generator 6a and an amplifier 6b, and it is configured to transmit energy from the power-transmitting antenna 2 to the surroundings.

Then, the controller 4 is capable of performing the control of the power-transmitting antenna 2, by controlling a RF switch(s) 3, based on the above-mentioned feedback signals fs.

Figure 23:
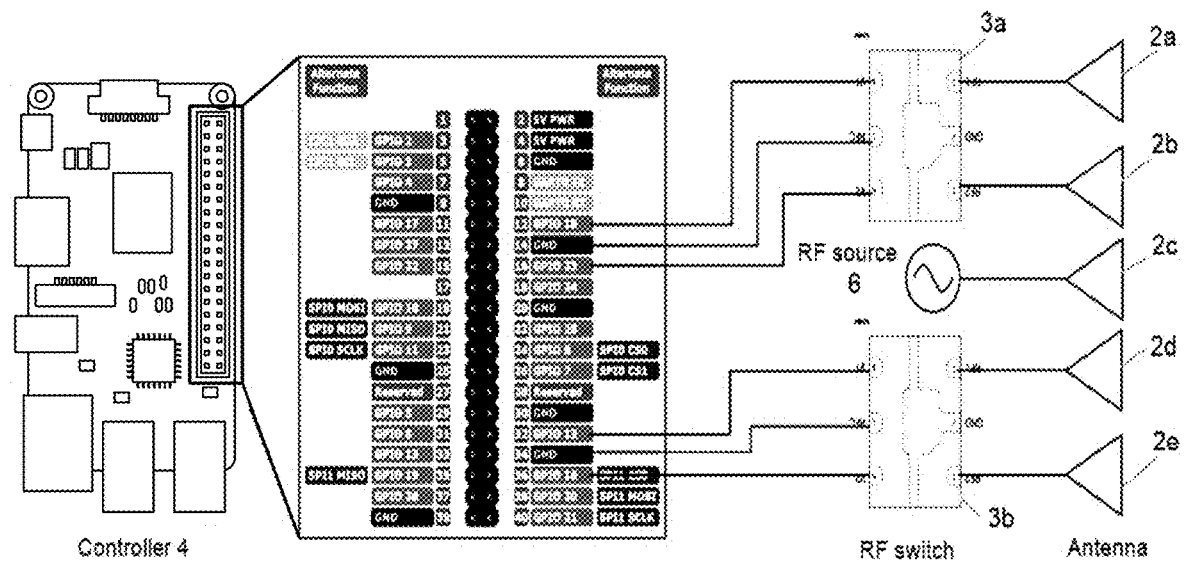
FIG. 23 is an example of a diagram schematically illustrating a power transmitting control of the power-transmitting device.

FIG. 23 schematically illustrates a diagram of the control of the power-transmitting antenna 2. The control is performed at the controller 4 of the power-transmitting device 1.

The controller 4 may be a small computer (for example, a microcomputer). For example, it may be configured as a single-board computer equipped with an ARM processor.

The power-transmitting antenna 2 is configured to include a plurality of antenna units 2a, 2b, 2c, 2d, and 2e, and each one of them is configured to transmit the output from the RF source 6.

Each one of the antenna units 2a, 2b, 2c, 2d, and 2e is configured to be independently controlled by the controller 4 with the RF switches 3a, 3b.

The controller, for example, controls the antenna 2 so as to transmit energy to the outside from only optimum antenna unit(s) (for example, 2c, 2d) among a plurality of antenna unit 2a, 2b, 2c, 2d, and 2e.

The power-transmitting antenna is configured to split beam into two, three or more split beams and then to emit the split beams.

Accordingly, the controller 4 of the power-transmitting device 1 is capable of performing the control for optimizing the wireless power supply. Furthermore, the power-transmitting device 1 is capable of sending a se (Sensor Enable) signal(s) (or enable signal) to the power-receiving device 10, with regard to the feedback signal fs illustrated in FIG. 16. The power-receiving device 10 is capable of performing the switching of respective conditions according to the se signal.

Beam Forming

As described above, in the examples 1 to 6, the power-transmitting device 1 is capable of performing the beam forming by using the reconfigurable antenna, by selecting and controlling any of the plurality of antenna units 2a to 2e constituting the power-transmitting antenna 2, as illustrated in FIG. 23. Hereinafter, with referring to FIGS. 24 and 25, a more specific description will be given for the beam forming of the power-transmitting antenna 2.

Figure 24:
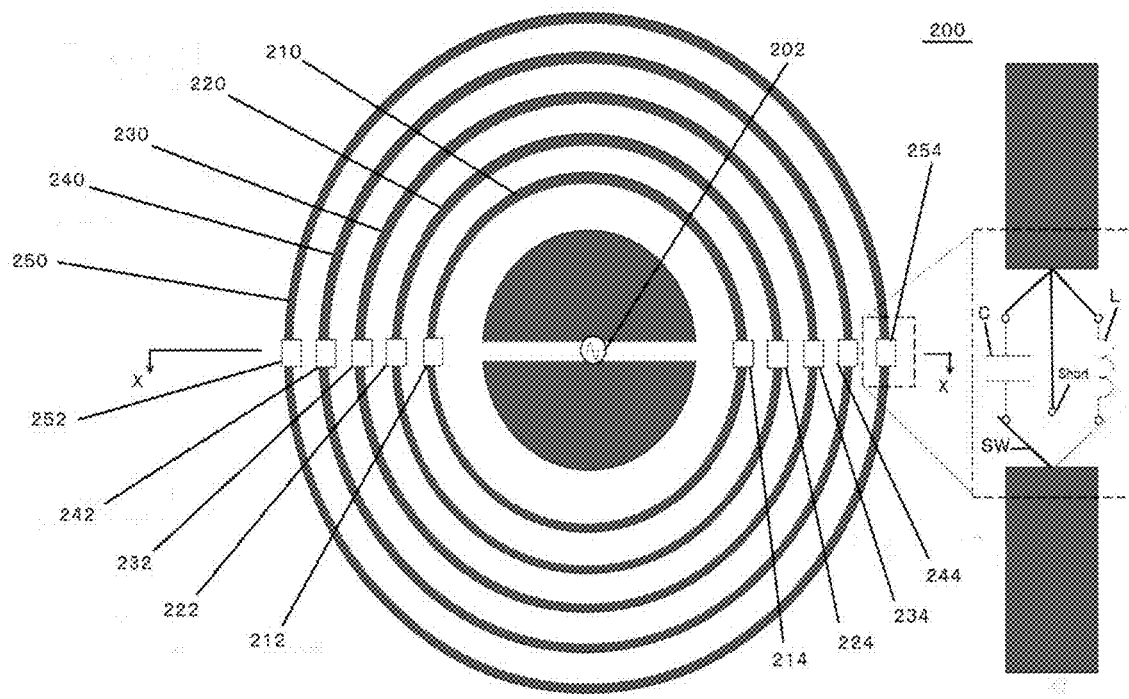
FIG. 24 is an example of a diagram illustrating a configuration of a power-transmitting antenna.

With referring to FIG. 24, a RF source (radio frequency source) 202 having the function of sending RF signals to the antenna 200 is illustrated. This can correspond to the RF signals which are sent to the transmitting-antenna 2 from the signal generator 6a through the amplifier 6b (see FIG. 22), or to the RF source 6 (see FIG. 23).

The antenna 200 is configured to have a plurality of antenna units 210, 220, 230, 240, and 250, which can correspond to the antenna units 2a, 2b, 2c, 2d, and 2e illustrated in FIG. 23.

The antenna units 210 to 250 (or 210, 220, 230, 240 and 250) are arranged concentrically in a nesting form to extend circumferentially, respectively. Accordingly, each one of the antenna units 210 to 250 is capable of circumferentially emitting energy to the surroundings.

With referring to FIG. 24, each one of the antenna units 210, 220, 230, 240, and 250 is configured to include switch units (or components for causing a phase difference) 212, 222, 232, 242, 252 and 214, 224, 234, 244, 254 so as to equally divide one circumference into two semicircles, respectively. By using these switch units, it becomes possible to control the phase of the electromagnetic waves.

On the right side of FIG. 24, one switch unit 254 is illustrated in an enlarged form, among the above-mentioned switches. As illustrated in this figure, each switch unit is provided with a LC circuit. The LC circuit is configured as an electric circuit having a coil L and a capacitor C. The LC circuit is a type of a resonant circuit. The LC circuit is configured to generate signals at a particular frequency. In addition, a "Short" can be included in the LC circuit. Therefore, it is configured to allow the selection of these components (L, C, and Short) by switching.

With referring to FIG. 24, it can be seen that the LC circuit is provided with a switch SW for controlling distribution of electric power which flows in the circuit. The switch SW is configured to select either one of three states, such as, a state in which electrical current flows only through the coil L between the coil L and the capacitor C in the LC circuit, a state in which electrical current flows only through the capacitor C, and a state in which electrical current does not flow through both of the coil L and the capacitor C (i.e. Short).

Each one of the antenna units 210 to 250 is capable of independently functioning the switch units 212 to 252 (or 212, 222, 232, 242 and 252) and 214 to 254 (or 214, 224, 234, 244 and 254), respectively. Each one of the switches is capable of performing three different types of switching.

Accordingly, in theory, it is configured to be capable of performing the control in $3^N$ ways in a case that N switches are used in total. For example, in a case that 5 switches are used, theoretically, it becomes possible to perform the control in 243 (or $3^5$) ways of combinations. Therefore, the antenna 200 is configured to perform a complicated control by individually controlling the components (i.e. the antenna units 210 to 250). For example, the antenna 200 is capable of focusing the superposition of the waves at close distances.

Figure 25:
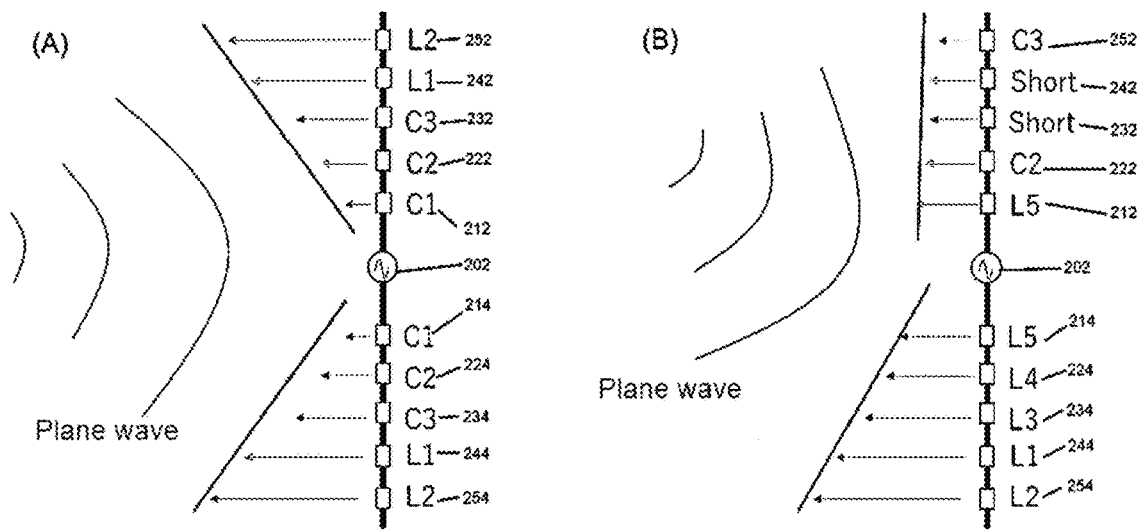
FIG. 25 is an example of a diagram illustrating two conditions in the cross-section taken along lines X-X in FIG. 24.

FIG. 25 illustrates a cross-section along the X-X line of the antenna 200 illustrated in FIG. 24. In FIG. 25, as depicted by (A) and (B), two different conditions for transmitting electric power according to the operations of the above-mentioned switch units are exemplified.

For example, in the condition of (A) in FIG. 25, the switch units 212 to 252 and 214 to 254 for equally dividing each antenna units 210 to 250 into two are selected to be equal to each other. That is, for example, the switch units 212 to 252 are arranged in the order of the conditions of C1, C2, C3, L1, and L2. Here, the reference symbol C indicates a capacitor, the reference symbol L indicates a coil, and the reference number indicates a degree of electric power which flows therethrough. Similarly, the switch units 214 to 254 are arranged in the order of the conditions of C1, C2, C3, L1, and L2. As a result, in the condition of (A) of FIG. 25, each one of the antenna units 210 to 250 is selected to have the two semicircular sections which are arranged to transmit energy equally to the surroundings, equally at the top side and the bottom side, and the beams are focused at a shallow angle on the front side.

In contrast, in the condition of (B) in FIG. 25, the switch units 212 to 252 and 214 to 254 for equally dividing each antenna unit 210 to 250 into two portions are selected to be different to each other. That is, the switch units 212 to 252 are arranged in the order of the conditions of L5, C2, Short, Short, and C3. On the other hand, the switch units 214 to 254 are arranged in the order of the conditions of L5, L4, L3, L1, and L2. As a result, in the condition of (B) of FIG. 26, each one of the antenna units 210 to 250 is selected to have the two semicircular sections which are arranged to transmit energy differently to the surroundings, differently at the top side and the bottom side, and the beams are focused at a shallow angle in the oblique direction.

For example, in the condition of (A) of FIG. 25, it is supposed that a feedback signal which indicates that the power-receiving condition of the power-receiving antenna 12 is not good is sent to the power-transmitting device 1. At this time, in a case when the controller 4 of the power-transmitting device 1 determines that it is necessary. to perform the beam forming of the power-transmitting antenna 2/200, then, it controls the switch units 212 to 252 and 214 to 254 of FIG. 24 in order to change the power-transmitting direction of the power-transmitting antenna 200, for example, to the condition of (B) of FIG. 25.

As described above, the power-transmitting antenna 2/200 of the power-transmitting device 1 is configured to have a reconfigurable metasurface. Incidentally, the shape and the configuration of the reconfigurable metasurface are not limited to the examples illustrated in the figures. For example, in the illustrated example, a plurality of circular antenna units are arranged concentrically in a nesting form, but the shape is not limited to the circular shape. In addition, in the illustrated example, a plurality of circular antenna units are divided into two semicircular portions. However, it is also possible to divide the plurality of circular antenna units into three, four or more so as to perform finer control. Furthermore, the illustrated power-transmitting antenna is configured to be on the same planar shape. However, in the other example, it is also possible to arrange each antenna unit 210 to 250 not to be on the same plane.

As described above, a reconfigurable power-transmitting device is configured. In the illustrated example, each switch is configured to be selected in 3 ways of L, C, and Short. However, in the other example each switch may be configured to be selected in 2 ways of L and C. In the latter case, it is configured to be capable of performing the beam forming in $2^N$ ways in a case that N switches are used in total. Therefore, the power-transmitting antenna is configured to have a plurality of antenna units, and each antenna unit is provided with a switch which is capable of causing (or creating) phase differences in two ways or in three ways. As a result, the power-transmitting antenna is configured to be capable of performing beam forming in $2^N$ or in $3^N$ of combinations in a case that N switches are used in total. Furthermore, the switches may be a combination of the type which is capable of selecting three kinds of L, C, and Short and a type which is capable of selecting two kinds of L and C.

Therefore, the power-transmitting antenna is configured to have a plurality of antenna units, and each antenna unit is provided with a switch which is capable of causing phase differences in two ways or in three ways. As a result, it is possible to perform beam forming in $2^N$ or in $3^N$ of combinations in a case that N switches are used in total.

In a case that the power-receiving device is portable during when the wireless power supply is conducted at intermediate distance or long-distance, the power-transmitting device is required to always transmit maximum electromagnetic energy. That is, the beam forming of the power-transmitting device is required according to circumstances. As the method, in general, an array antenna is used, and its beam forming is conducted by performing the phase control of each antenna. However, with this configuration, there are problems. For example, the direction of the beam forming is limited to only one direction. In addition, its cost is relatively high, and the beam angle is limited.

In the case of the present example, in order to solve the above-mentioned problems, the receiving strength is fed back to the antenna, and switches are provided for turning on and off the GND and the parasitic elements arranged around the antenna. As a result, the system is configured to be capable of transmitting maximum electric power by using a beam pattern and a wide beam angle according to the number of switches, nearly all the time. For example, the beam angle may be made to make a pattern to emit beams toward each one of the two or three power-receiving devices.

Electric Field Strength

As described above, in the above-mentioned examples 1 to 6, the controller 4 of the power-transmitting device 1 is capable of performing the beam forming of the power-transmitting antenna 2. To perform this task, it is preferable to know the electric field strength in each condition of the power-receiving device 10, in advance.

For example, the controller 4 of the power-transmitting device 1 is capable of storing the power receiving conditions of the power-receiving device 10 in each case when the robot arm unit 90 and/or the robot hand unit 80 is operated in the FA or the like (see FIG. 1).

For this reason, for example, it is conceivable that voltage values of the power-receiving device 10 are actually measured under various situations, at each position of the robot arm unit 90 and/or the robot hand unit 80 moving at a high degree of freedom.

Alternatively, it is also conceivable that, by using a computer simulation, a virtual reality (VR) system, or the like, pseudo voltage values of the power-receiving device 10 are determined under various situations, at each position of the robot arm unit 90 and/or the robot hand unit 80 moving at a high degree of freedom.

The controller 4 is capable of storing various values of the voltages and the positions of the robot arm unit 90 and/or the robot hand unit 80. For example, these values may be stored in a table (which is an arrangement of information or data) or a database, etc.

The controller 4 of the power-transmitting device 1 is capable of estimating the position, the orientation, etc., of the power-receiving antenna 12 at each moment, by using the feedback signals fs transmitted from the controller 40 of the power-receiving device 10 in combination with the above-mentioned table or database, etc. Accordingly, the controller of the power-transmitting device 1 is capable of performing the control (or beam forming) of the power-transmitting antenna 2 to excellently transmit energy toward the estimated power-receiving antenna 12.

There are various ways to determine the electric field distribution in FA (for example, at a work site in a factory) in which the power-receiving device 10 is used, by conducting the actual measurement in advance.

Figure 26:
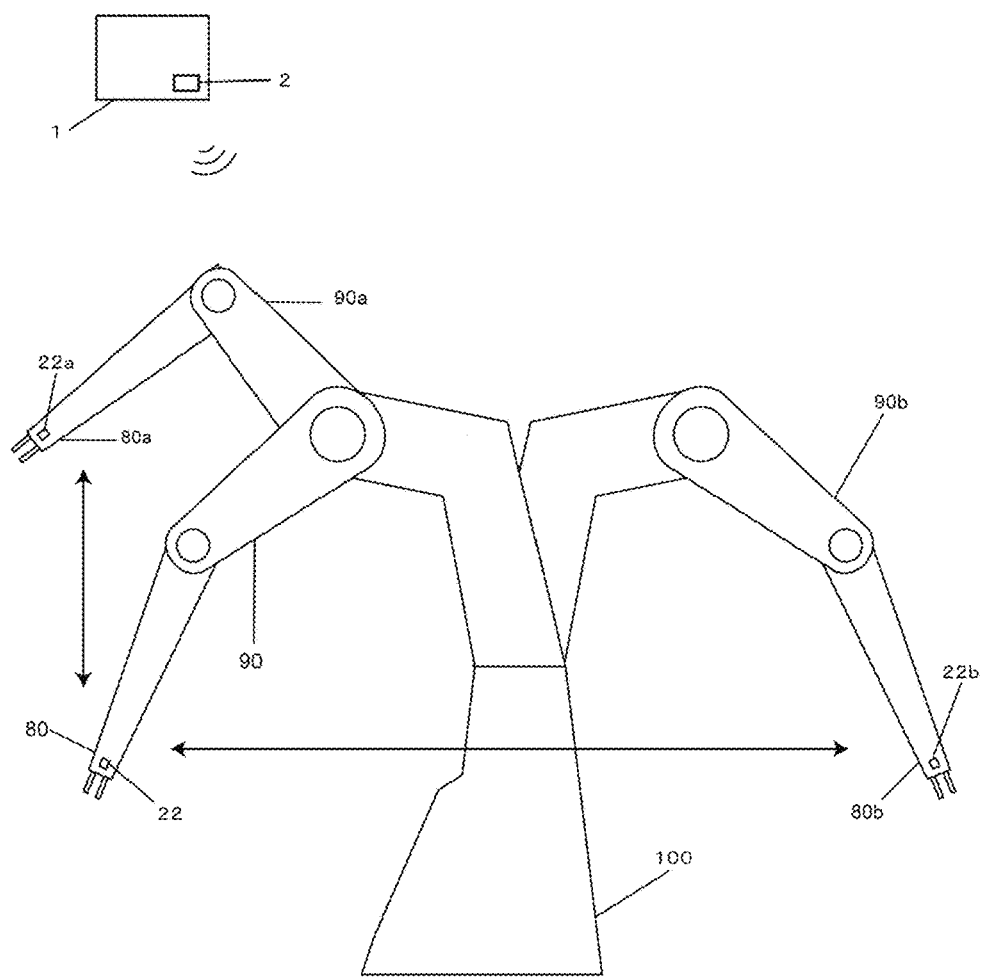
FIG. 26 is an example of a diagram schematically illustrating a tracking of the electric field strength of the power-receiving device.

In FIG. 26, it is schematically illustrated that the electric field distribution may be measured by tracking the lighting of the LED 22 of the power-receiving device 10.

As described above, in the first to sixth examples, the LED 22 is provided so as to easily confirm the power receiving condition of the power-receiving antennae 12. By continuously tracking the lighting conditions of the LED 22, it becomes possible to comprehend the electric field distribution when the machine 100 moves variously. For example, a camera may be provided close to the machine 100 to continuously capture still images of the lighting conditions of the LED 22. For example, when the shutter speed of the camera is short, the lighting of the LED 22 may be captured as a point. On the contrary, when the shutter speed of the camera is longer, the lighting of the LED 22 may be captured as a line. In the latter case, the trajectory of the light can be recorded in one image.

For example, in FIG. 26, it can be seen that the articulated robot 100 is capable of moving vertically as illustrated by the vertical arrow. In addition, the articulated robot 100 is capable of moving in the horizontal direction as illustrated by the lateral arrow. Furthermore, the articulated robot 100 is capable of performing angled movement, rotational movement, or the like. In each case when the articulated robot 100 moves at a high degree of freedom, it is possible to actually measure the electric field distribution of the power-receiving device 10 by continuously observing and recording the lighting conditions of the LED 22. Alternatively, it is also possible to trace the lighting of the LED 22 with moving images.

Incidentally, the lighting of the LED 22 is actually a weak light. However, by turning off the ambient light to darkness, the weak light becomes to be tracked. Thus, in each case when the articulated robot 100 moves at each joint, it is possible to obtain the electric field distribution by observing and aggregating (or grouping) the degrees or levels of the lighting of the LED 22. The power-transmitting device 1 may perform the beamforming for optimizing the wireless power supply by storing the information of the electric field distribution in advance and by using the above-mentioned feedback signals fs in combination with the stored information.

Thus, by providing the LED 22 in the power-receiving device, it become possible to visually comprehend electric power to be received, according to the presence or absence of the lighting and/or the intensity of the lighting. When the power receiving system (for example, the robot hand, the robot arm, etc.) is operated to move, the position for receiving power and electric power to be received are changed. Accordingly, the condition of the LED 22 is made to be changed. In order to continuously record these conditions, the lighting may be exposed for a long period of time with a camera. As a result, it is possible to record the strength of the LED 22 and the locus of the operation of the power-receiving system. Therefore, it becomes possible to comprehend when and how much electric power is received in each condition.

As described above, it is possible to map the electric field distribution by comprehending the electric field strength and storing the results so as to map the data. For example, data may be stored in a storage device in the power-transmitting device 1. In this way, it is possible to comprehend the electric field distribution at the work site in the FA where the product is actually used, in advance. Therefore, it becomes possible to comprehend whether it is suitable for performing the wireless power supply, in actual use.

With referring to FIG. 1 again, when electric power is supplied to the sensor 30 wirelessly, it may be needed to replace the secondary battery regularly. In particular, in the FA, the operation frequency per day is high so that it is conceivable that the replacement frequency of the secondary batteries is also high. Therefore, when performing wireless power supply, peculiar to the FA, it is needed to regularly manage the battery managing system 21 which includes the sensor 30 and the radio communication.

In each case of the above-mentioned examples 1 to 6, it is possible to predict a battery failure when the battery 20 is used. In general, the battery deteriorates, and the service life of the battery is limited accordingly. Therefore, if it is possible to comprehend the deterioration condition and to predict the failure, it will be useful. In the present example, it is possible to comprehend the degree of deterioration by paying attention to changes in the efficiency of charging. Thus, it is possible to monitor the efficiency of charging periodically and compare it with the efficiency at the start of operation. That is, when it is found out that the efficiency of charging deteriorates remarkably or when it is found out that the predicted failure time is near, then, the battery may be replaced. This task may be conducted by the controller 4 of the power-transmitting device 1 and/or by the controller 40 of the power-receiving device 10. Furthermore, according to the illustrated examples 1 to 6, the power-receiving device 10 may be compactly collected as a whole, and it may be provided collectively at the distal end side of a machine 100. This eliminates or minimizes its wiring within the machine 100 and facilitates the access thereto, from the outside. As a result, supplying electric power to the sensor 30 is ensured and the maintenance thereof is increased.

Method of Magnetic Resonance

As described above, in the examples 1 to 6, radiation type wireless power supply is performed for supplying relatively small power at a relatively long distance (for example, 1 m and 1 mW) based on the microwave system.

It is also known that non-radiation type wireless power supply can be performed for supplying relatively large power at a relatively short distance (for example, 1 cm and 5 W) based on the magnetic resonance system.

In the case of the microwave system, when the efficiency is reduced due to the impedance mismatching with a sensor operating at relatively small electric power, it may become a major problem. On the contrary, in the case of the magnetic resonance system, when the efficiency is reduced due to the impedance mismatching with a sensor operating at relatively small electric power, the reduction in the efficiency may be practically judged to be extremely small.

However, even in the case when wireless power supply is performed based on the magnetic resonance system, similar to the case of the microwave system, electromagnetic waves (RF) are converted into direct current voltages (DC). When the RF side and the DC side are connected, the impedance mismatching may occur. Accordingly, the technique of impedance matching will be required in order to efficiently receive electric power of RF. This problem itself is the same in both the magnetic resonance system and the microwave system. Accordingly, it is possible to apply the examples 1 to 6 to the case of the magnetic resonance system in order to solve this problem. However, the effect of the application is more practically greater in the microwave system than in the magnetic resonance system. Therefore, the examples 1 to 6 are helpful when performing wireless power supply based on the microwave system.

Major terms used are as follows:
1 . . . Power-transmitting device
2 . . . Power-transmitting antenna
4 . . . Controller (for example, host computer)
10 . . . Power-receiving device
12 . . . Power-receiving antenna
14 . . . Rectifier
16 . . . Power storage device (for example, capacitor)
20 . . . Power storage device (for example, battery)
30 . . . Device or Module (for example, sensor)
40 . . . Controller
50 . . . Radio communication IC or Wireless communication IC
80 . . . Robot hand unit
90 . . . Robot arm unit
100 . . . Machine or Machinery (for example, articulated robot)
200 . . . Power-transmitting antenna

What is claimed is:

1. A power-receiving device, comprising:
a power-receiving antenna adapted to receive microwaves at a frequency greater than or equal to 0.9 GHz;
a rectifier adapted to convert the microwaves received by the power-receiving antenna into voltages; and
a controller adapted to:
calculate information from a plurality of voltage values of voltages measured at different timings and locations; and
send the calculated information as a feedback information,
wherein the plurality of voltage values include voltage values measured from at least a first location between the power-receiving antenna and one side of a switch in the power-receiving device and from a second location at an opposite side of the switch,
wherein the feedback information is related to a power receiving condition that is observed based on the voltage values and a time required to reach from one of the voltage values to another one of the voltage values, and
wherein the feedback information is related to an amount of change in the voltage values over a measured period of time.

2. The power-receiving device according to claim 1, further comprising:
a first element functionally connected to the rectifier at the first location; and
a second element functionally connected to the rectifier via the switch at the second location;
wherein the controller is adapted to send the feedback information calculated from the voltage values of the first element when the switch is in an off-state.

3. The power-receiving device according to claim 1, further comprising:
a power storage device and a sensor, each of which is functionally connected to the rectifier via the switch;
wherein the controller is adapted to selectively supply power to the power storage device and the sensor by use of the switch, thereby suppressing impedance mismatch between a side of the rectifier and a side of the sensor.

4. The power-receiving device according to claim 1, further comprising an output portion configured to output information for displaying the power-receiving condition.

5. The power-receiving device according to claim 4, further comprising a light-emitting diode configured to display the power-receiving condition which is related to an amount of electric current flowing to the light-emitting diode.

6. The power-receiving device according to claim 4, wherein the rectifier is functionally connected to a light-emitting diode via a switch,
wherein the controller is adapted to turn on the switch to enable confirmation of the power-receiving condition.

7. The power-receiving device according to claim 1, wherein the feedback information is used to switch a circuit in the power-receiving device to optimize the wireless power supply system.

8. The power-receiving device according to claim 1, wherein the feedback information is used to change a transmission direction of the microwaves.

9. The power-receiving device according to claim 1, wherein the power-receiving antenna is mounted on a movable device in a factory.

10. The power-receiving device according to claim 1, wherein the switch is a low dropout (LDO) regulator.

11. The power-receiving device according to claim 2, wherein the switch is a low dropout (LDO) regulator.

12. The power-receiving device according to claim 3, wherein the switch is a low dropout (LDO) regulator.

13. The power-receiving device according to claim 6, wherein the switch is a low dropout (LDO) regulator.

* * * * *